United States Patent [19]
Paul

[11] Patent Number: 5,513,370
[45] Date of Patent: Apr. 30, 1996

[54] TWISTED PAIR AND ATTACHMENT UNIT INTERFACE (AUI) CODING AND TRANSCEIVING CIRCUIT WITH FULL DUPLEX, TESTING, ISOLATION, AND AUTOMATIC OUTPUT SELECTION

[75] Inventor: Prasun K. Paul, Santa Clara, Calif.

[73] Assignee: National Semiconductor Corporation, Santa Clara, Calif.

[21] Appl. No.: 113,382

[22] Filed: Aug. 27, 1993

Related U.S. Application Data

[63] Continuation-in-part of Ser. No. 995,598, Dec. 22, 1992, Pat. No. 5,446,914.

[51] Int. Cl.⁶ ............................ G06F 11/14; G06F 13/40; G06F 13/376; G06F 15/20
[52] U.S. Cl. ................ 395/800; 364/222.2; 364/229.5; 364/232.93; 364/239.4; 364/240.1; 364/239.9; 364/242; 364/242.5; 364/251.4; 364/264.7; 364/266.4; 364/269; 364/271.4; 364/DIG. 1; 364/DIG. 2; 370/85.3; 340/825.01
[58] Field of Search ................... 395/800, 750, 395/200, 84, 325, 90, 575, 200.06, 200.1, 200.02, 650; 370/13, 14, 16, 85.3, 79, 85.5, 85.2, 85.7, 94.1, 85.11; 371/11.2, 16.3; 340/825.34, 825.13, 825.01, 825.5, 825.36, 825.22; 364/DIG. 1, DIG. 2, 580; 375/224, 317

[56] References Cited

U.S. PATENT DOCUMENTS

| 4,602,364 | 7/1986 | Herman et al. | 340/85.52 |
| 5,249,183 | 9/1993 | Wong et al. | 370/85.3 |
| 5,289,458 | 2/1994 | Taha | 370/16 |
| 5,315,590 | 5/1994 | Vijeh et al. | 390/79 |
| 5,396,495 | 3/1995 | Moorwood et al. | 370/85.13 |
| 5,414,708 | 5/1995 | Webber et al. | 370/16 |

OTHER PUBLICATIONS

Preliminary Data Sheet, AM79C940, Media Access Controller for Ethernet (MACE) from Advanced Micro Device, Nov. 1992.

Primary Examiner—Daniel Pan
Attorney, Agent, or Firm—Limbach & Limbach

[57] ABSTRACT

An Ethernet circuit that combines the basic functionality of a twisted pair transceiver and a twisted pair/AUI encoder/decoder provides an autoswitching circuit that switches between a twisted pair data pathway and an AUI data pathway by changing from the twisted pair data pathway to the AUI data pathway when a link circuit fails to detect signals on the twisted pair medium and when the Ethernet circuit is not transmitting or executing a jabber procedure, and by changing from the AUI data pathway to the twisted pair data pathway when the link circuit detects signals on the twisted pair medium and when the Ethernet circuit is not transmitting or receiving.

28 Claims, 27 Drawing Sheets

| PIN NO. | NAME | I/O | DESCRIPTION |
|---|---|---|---|
| 1 | /COLED | O | COLLISION LED: An open drain active low output. It is asserted for approximately 50ms whenever the TEMPL detects a collision either in TP mode or in AUI mode. |
| 2 | /RXLED | O | RECEIVE LED: An open drain active low output. It is asserted for approximately 50ms whenever the TEMPL receives data either in TP mode or in AUI mode. |
| 3 | /TXLED | O | TRANSMIT LED: An open drain active low output. It is asserted for approximately 50ms whenever the TEMPL transmits data either in TP mode or in AUI mode. |
| 5 | OSCOUT | O | EXTERNAL OSCILLATOR OUTPUT: This pin is used to provide clocking signal to the ENDEC. Nothing should be connected to this pin when oscillator is used. |
| 6 | OSCIN | I | EXTERNAL OSCILLATOR INPUT (TTL): This pin is used to provide clocking signals to the internal ENDEC. Either 40MHz or 20MHz oscillator can be connected to this pin by properly setting 40/20MHz select pin. |
| 8 | 40/20MHz | I | 40/20MHz SELECT: This pin provides an option to use 40MHz or 20MHz oscillator to the oscillator input (OSCIN). It is a TTL level input. When high 40MHz input is selected, when low 20MHz oscillator input is selected. |
| 9 | EWRAP | I | ENDEC LOOPBACK: A TTL level active high input. This enables data loopback through the endec. |
| 10 | TXE | I | TRANSMIT ENABLE: A TTL level active high data encoder enable input. This signal is sampled by the endec at the rising edge of transmit clock. |
| 11 | TFI | I | TRAFFIC IGNORE: A TTL level active high input. In this mode the transceiver can operate in full duplex mode. Data can be received and transmitted simultaneously without any collision. |

FIG. 6A

4.0 Pin Description

| PIN NO. | NAME | I/O | DESCRIPTION |
|---|---|---|---|
| 12 | XMRAP | I | TRANSCEIVER LOOPBACK: A TTL level active high input. This signal enables loopback of data through the transceiver from the controller input. Data does not go out to the media and disables the receive circuitry to avoid collision. |
| 13 | COL | O | COLLISION DETECT OUTPUT: A TTL/MOS level active high output. This signal generates an active high output when 10MHz collision signal is detected from the transceiver. |
| 14 | RXC | O | RECEIVE CLOCK: A TTL/MOS level recovered clock. When the phase-locked loop locks to a valid incoming signal, a 10MHz clock signal is activated on this output. This output remains low during idle (5 bit times after activity ceases at receive input). |
| 15 | RXD | O | RECEIVE DATA OUTPUT: A TTL/MOS level signal. This is the NRZ data output from the digital phase-locked loop. This signal should be sampled by the controller at the rising edge of receive clock. |
| 16 | CRS | O | CARRIER SENSE: A TTL/MOS level active high signal. It is asserted when valid data from the transceiver is present at the receive input. It is de-asserted one and a half bit times after the last bit at receive input. |
| 17 | TXD | I | TRANSMIT DATA: A TTL level input. This signal is sampled by the endec at the rising edge of transmit clock when transmit enable input is high. The endec combines transmit data and transmit clock signals into a Manchester encoded bit stream and sends it to the transceiver. |
| 18 | TXC | O | TRANSMIT CLOCK: A TTL/MOS level 10MHz clock signal derived from the 40/20 MHz oscillator. This clock signal is always active. |
| 21 | /LNKDIS | I | LINK DISABLE: If this pin is tied to ground, the link integrity function is disabled. If Link function is disabled the transceiver does not transmit any link pulses and always stays at good link state. |
| 22 | HBE | I/O | HEARTBEAT ENABLE: When connected to high Heartbeat function is enabled and if this pin is connected to the GND heartbeat function (SQE test) is disabled. |

FIG. 6B(1)

| | | | |
|---|---|---|---|
| 23 | TEST | I | FACTORY INPUT SIGNAL: Used to check internal functions of the part. This should be tied to low during normal operation. |
| 25 | /RESET | I | RESET: This is an active low, schmitt trigger input. When this pin is asserted low, all the inputs to the MPC are tristated. The output drivers to MPC are COL, RXC, RXD, CRS, and TXC. At the falling edge of the RESET signal the output drivers are tristated immediately. After the rising edge of the RESET signal TEMPL becomes active with a 10 ns delay set internally. |
| 26 | LOWSQL | I | LOW SQUELCH SELECT: If this pin is connected to high, the twisted-pair receiver threshold will be set lower than the 10BASE-T specification. |
| 27 | AUI/TP | I | AUI/TPI SELECT: A TTL level input that selects either the AUI interface of the endec only or the Twisted Pair Transceiver module and endec. When connected to high AUI is selected, when connected to low TPI is selected. |
| 31<br>32 | TX+<br>TX- | O | AUI TRANSMIT OUTPUT: Differential driver which sends the encoded data to the transceiver. The outputs are source followers which require 270Ω pulldown resistors. |
| 34<br>35 | RX+<br>RX- | I | AUI RECEIVE INPUT: Differential receive input pair from the AUI circuit. |
| 36<br>37 | CD+<br>CD- | I | AUI COLLISION INPUT: Differential collision input pair from the AUI circuits. |
| 40,41 | RXI+,RXI- | I | TWISTED PAIR RECEIVE INPUTS: These inputs feed a differential amplifier which passes TTL/MOS level Manchester data to the ENDEC module. The common mode voltage of these inputs is set internally and should not be altered. |
| 42,43<br>44,45 | TXOd-,TXO+<br>TXO-,TXOd+ | O | TWISTED PAIR TRANSMIT OUTPUTS: These high drive CMOS level outputs are resistively combined external to the chip to produce a differential output signal with equalization to compensate for Intersymbol Interference (ISI) on the twisted-pair medium. |

| |
|---|
| FIG. 6B(1) |
| FIG. 6B(2) |

KEY TO FIG. 6B

FIG. 6B(2)

4.0 Pin Description

| PIN NO. | NAME | I/O | DESCRIPTION |
|---|---|---|---|
| 51 | /LNKLED | O | GOOD LINK: This is an open drain N-channel active low output and is suitable for driving a LED. This output is off if the TEMPL is in AUI mode. In twisted pair transceiver mode, the output will be low if link integrity function is enabled and link integrity is good (i.e., the twisted-pair link has not been broken). The output will stay low if the link integrity function is disabled. |
| 52 | /POLED | O | POLARITY: An open drain active low output. This signal is asserted in transceiver mode (AUI/-TP=0) when the transceiver detects seven consecutive link pulses or three consecutive packets with reversed polarity. |

POWER SUPPLY PINS (DIGITAL)

| PIN NO. | NAME | I/O | DESCRIPTION |
|---|---|---|---|
| 19 | GNDL | | NEGATIVE (GROUND) PIN: It is suggested to connect a decoupling capacitor between VCCL and GNDL |
| 20 | VCCL | | POSITIVE 5V SUPPLY PIN FOR THE DIGITAL CIRCUITS OF TEMPL |

FIG. 6C(1)

| POWER SUPPLY PINS (ANALOG) | | |
|---|---|---|
| 4 | OSCGND | LED/OSCILLATOR GROUND: Ground pin for the LED and oscillator circuitry. |
| 7 | OSCVCC | OSCILLATOR 5V SUPPLY: Power pin supplies 5V to the oscillator circuitry. |
| 28 | PLLVCC | PLL 5V SUPPLY: Care should be taken to reduce noise on this pin as it supplies power to the analog VCO of the Phase Lock Loop. |
| 29 | PLLGND | PLL GROUND SUPPLY: Care should be taken to reduce noise on this pin as it supplies ground to the analog VCO of the Phase Lock Loop. |
| 30 | TXGND | AUI TRANSMIT GROUND: Ground pin for AUI Transmitter. |
| 33 | TXVCC | AUI TRANSMIT 5V SUPPLY: Power pin supplies 5V to AUI Transmitter. |
| 38 | RXGND | TPI & AUI RECEIVE GROUND: Ground pin for twisted-pair receiver and AUI receiver. |
| 39 | RXVCC | TPI & AUI RECEIVE 5V SUPPLY: Power pin supplies 5V to AUI Receiver. |
| 46 | TDVCC | TPI TRANSMIT 5V SUPPLY: Power pin supplies 5V to the transmitter of the twisted-pair interface. |
| 47 | TDGND | TPI TRANSMIT GROUND: Ground pin for the twisted-pair interface Transmitter. |
| NO CONNECTION | | |
| 24,48 49,50 | NC | NO CONNECTION: Do not connect to these pins. |

FIG. 6C(2)

| FIG. 6C(1) | FIG. 6C(2) |
|---|---|

KEY TO FIG. 6C

PIN DESCRIPTION OF THE TWISTED-PAIR ETHERNET MODULE FOR PHYSICAL LAYER (ENHANCED TEMPL)

| PIN NO. | PIN NAME | I/O | ENHANCED TEMPL PIN DESCRIPTION |
|---|---|---|---|
| 1 | /COLED | O | COLLISION LED: An open drain active low output. It is asserted for approximately 50ms whenever the ETEMPL detects a collision either in TP mode or in AUI mode. |
| 2 | /RXLED | O | RECEIVE LED: An open drain active low output. It is asserted for approximately 50ms whenever the ETEMPL receives data either in TP mode or in AUI mode. |
| 3 | /TXLED | O | TRANSMIT LED: An open drain active low output. It is asserted for approximately 50ms whenever the ETEMPL transmits data either in TP mode or in AUI mode. |
| 5 | OSCOUT | O | CRYSTAL FEEDBACK OUTPUT: This pin is used to provide clocking signal to the endec. Nothing should be connected to this pin if an oscillator is used. A crystal can be connected to this pin along with OSCIN. |
| 6 | OSCIN | I | CRYSTAL OR EXTERNAL OSCILLATOR INPUT (TTL): This pin is used to provide clocking signals to the internal endec. Either 40MHz or 20MHz oscillator can be connected to this pin by properly setting 40/20MHz select pin. A 20 MHz crystal may be connected to this pin along with OSCOUT. |
| 8 | 40/20MHz | I | 40/20MHz SELECT: This pin provides an option to use 40MHz or 20MHz oscillator to the oscillator input (OSCIN). It is a TTL level input. When high 40MHz input is selected, when low 20MHz oscillator input is selected. |
| 9 | EWRAP | I | ENDEC LOOPBACK: A TTL level active high input. This enables data loopback through the endec. |

FIG. 16A(1)

| | | | |
|---|---|---|---|
| 10 | TXE | I | TRANSMIT ENABLE: A TTL level active high data encoder enable input. This signal is sampled by the endec at the rising edge of transmit clock. |
| 11 | TFI | I | TRAFFIC IGNORE: A TTL level active high input. In this mode the transceiver can operate in full duplex mode. Data can be received and transmitted simultaneously without any collision. |
| 12 | XWRAP | I | TRANSCEIVER LOOPBACK: A TTL level active high input. This enables to loopback data through the transceiver. Data does not go out to the media and disables the receive circuitry to avoid collision. |
| 13 | COL | O | COLLISION DETECT OUTPUT: A TTL/MOS level active high output. This signal generates an active high output when 10MHz collision signal is detected from the transceiver. |
| 14 | RXC | O | RECEIVE CLOCK: A TTL/MOS level recovered clock. When the phase-lock loop locks to a valid incoming signal, a 10 MHz clock signal is activated on this output RXC provides 5 extra bits after the last positive transition of the receive data. The output remains low during idle. |
| 15 | RXD | O | RECEIVE DATA OUTPUT: A TTL/MOS level signal. This is the NRZ data output from the digital phase-lock loop. This signal should be sampled by the controller at the rising edge of the receive clock. |
| 16 | CRS | O | CARRIER SENSE: A TTL level active high signal. It is asserted when valid data from the transceiver is present at the receive input. It is de-asserted one and a half bit times after the last bit at the receive input. |
| 17 | TXD | I | TRANSMIT DATA: A TTL level input. This signal is sampled by the endec at the rising edge of transmit clock when transmit enable input is high. The endec combines transmit data and transmit clock signals into a Manchester encoded bit stream and sends it to the transceiver. |

| FIG. 16A(1) |
|---|
| FIG. 16A(2) |

KEY TO FIG. 16A

FIG. 16A(2)

| PIN NO. | NAME | I/O | ENHANCED TEMPL PIN DESCRIPTION |
|---|---|---|---|
| 18 | TXC | O | TRANSMIT CLOCK: A TTL/MOS level 10MHz clock signal derived from the 40/20 MHz oscillator. This clock signal is always active. |
| 21 | /LNKDIS | I | LINK DISABLE: If this pin is tied to ground, the link integrity function is disabled. If Link function is disabled the transceiver does not transmit any link pulses and always stays at good link state. |
| 22 | HBE | I | HEARTBEAT ENABLE: When connected to high Heartbeat function is enabled and if this pin is connected to the GND heartbeat function (SQE test) is disabled. |
| 23 | TEST | I | FACTORY INPUT SIGNAL: Used to check internal functions of the part. This should be tied to low during normal operation. |
| 24 | /JABDIS | I | JABDIS: This is an active low input. When this pin is activated in the Traffic Ignore (TF) mode or in endec wrap (EWRAP) mode, it disables the jabber function. |
| 25 | /RESET | I | RESET: This is an active low, schmitt trigger input. When this pin is asserted low, all the outputs to the MPC are tri-stated. The output drivers to MPC are COL, RXC, RXD, CRS, and TXC. At the falling edge of the RESET signal the output drivers are tri-stated immediately. After the rising edge of the RESET signal ETEMPL becomes active with a 10ns delay set internally. |
| 26 | LOWSQL | I | LOW SQUELCH SELECT: If this pin is connected to high, the twisted-pair receiver threshold will be set lower than the 10BASE-T specification. |
| 27 | AUI/-TP | I | AUI/TPI SELECT: A TTL level input that selects either the AUI interface of the endec only or the Twisted Pair Transceiver module and endec. When connected to high AUI is selected, when connected to low TPI is selected. |

FIG. 16B(1)

| | | | |
|---|---|---|---|
| 31 32 | TX- TX+ | O | TRANSMIT OUTPUT: Differential driver which sends the encoded data to the transceiver. |
| 34 35 | RX- RX+ | I | AUI RECEIVE INPUT: Differential receive input pair from the transceiver. |
| 36 37 | CD- CD+ | I | AUI COLLISION INPUT: Differential collision input pair from the transceiver. |
| 40 41 | RXI+ RXI- | I | TWISTED PAIR RECEIVE INPUTS: These inputs feed a differential amplifier which passes TTL/MOS level Manchester data to the endec module. The common mode voltage of these inputs is set internally and should not be altered. |
| 42 45 | TXOU- TXOU+ | O | TWISTED-PAIR TRANSMIT DRIVERS FOR UTP: This pair of drivers provide pre-emphasized and filtered differential output for UTP (100Ω cable). These drivers maintain same common mode voltage during data transmission and idle mode. |
| 43 44 | TXOS- TXOS+ | O | TWISTED-PAIR TRANSMIT DRIVERS FOR STP: This pair of drivers provide pre-emphasized and filtered differential output for STP (150Ω cable). These drivers maintain same common mode voltage during data transmission and idle mode. |
| 48 | R EQ | I | EQUALIZATION RESISTOR: A resistor REQ (TBD) is connected from this pin to GND or VCC to change the equalization of the TP output. |
| 49 | R TX | I | TRANSMIT LEVEL RESISTOR: A resistor RTX (TBD) is connected from this pin to GND or VCC to change the TP output signal level. |
| 50 | UTP/STP | I | UTP/STP SELECT: This pin selects drivers for UTP or STP. If this pin is connected to GND UTP (100Ω cable) media is selected. To select STP (150Ω cable) drivers this pin is connected to VCC. |

| FIG. 16B(1) |
|---|
| FIG. 16B(2) |

KEY TO FIG. 16B

FIG. 16B(2)

| PIN NO. | NAME | I/O | ENHANCED TEMPL PIN DESCRIPTION |
|---|---|---|---|
| 51 | /LNKLED | O | GOOD LINK: This is an open drain N-channel active low output and is suitable for driving an LED. This output is off if the ETEMPL is in AUI mode. In twisted-pair transceiver mode, the output will be low if link integrity function is enabled and link integrity is good (i.e., the twisted-pair link has not been broken). The output will stay low if the link integrity function is disabled. |
| 52 | /POLED | O | POLARITY: An open drain active low output. This signal is asserted in transceiver mode (AUI/-TP=0) when the transceiver detects seven consecutive link pulses or three consecutive packets with reversed polarity. |

POWER SUPPLY PINS (DIGITAL)

| PIN NO. | NAME | I/O | ENHANCED TEMPL PIN DESCRIPTION |
|---|---|---|---|
| 19 | GNDL | | NEGATIVE (GROUND) PIN: It is suggested to connect a decoupling capacitor between VCCL and GNDL. |
| 20 | VCCL | | POSITIVE 5V SUPPLY PIN FOR THE DIGITAL CIRCUITS OF ETEMPL. |

FIG. 16C(1)

| POWER SUPPLY PINS (ANALOG) | | |
|---|---|---|
| 4 | OSCGND | LED/OSCILLATOR GROUND: Ground pin for the LEDs and oscillator circuitry. |
| 7 | OSCVCC | OSCILLATOR 5V SUPPLY: Power pin supplies 5V to the oscillator circuitry. |
| 28 | PLLVCC | PLL 5V SUPPLY: Care should be taken to reduce noise on this pin as it supplies power to the analog VCO of the phase-lock loop. |
| 29 | PLLGND | PLL GROUND SUPPLY: Care should be taken to reduce noise on this pin as it supplies ground to the analog VCO of the phase-lock loop. |
| 30 | TXGND | AUI TRANSMIT GROUND: Ground pin for AUI transmitter. |
| 33 | TXVCC | AUI TRANSMIT 5V SUPPLY: Power pin supplies 5V to AUI transmitter. |
| 38 | RXGND | TPI & AUI RECEIVE GROUND: Ground pin for twisted-pair receiver and AUI receiver. |
| 39 | RXVCC | TPI & AUI RECEIVE 5V SUPPLY: Power pin supplies 5V to the twisted-pair receiver and AUI receiver. |
| 46 | TDVCC | TPI TRANSMIT 5V SUPPLY: Power pin supplies 5V to the transmitter of the twisted-pair interface. |
| 47 | TDGND | TPI TRANSMIT GROUND: Ground pin for the transmitter of the twisted-pair interface. |

FIG. 16C(2)

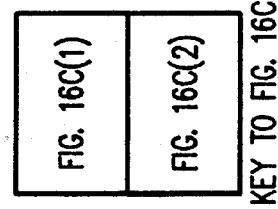

KEY TO FIG. 16C

TWISTED PAIR AND ATTACHMENT UNIT INTERFACE (AUI) CODING AND TRANSCEIVING CIRCUIT WITH FULL DUPLEX, TESTING, ISOLATION, AND AUTOMATIC OUTPUT SELECTION

RELATED APPLICATION

The present application is a continuation-in-part of U.S. patent application Ser. No. 07/995,598 filed Dec. 22, 1992, now U.S. Pat. No. 5,446,914, which is related to commonly-assigned U.S. patent application Ser. No. 07/995,193, filed on Dec. 22, 1992, now U.S. Pat. No. 5,336,946, for DIFFERENTIAL OUTPUT STAGE WITH REDUCED IDLE CURRENT and commonly-assigned U.S. patent application Ser. No. 07/994,660, filed on Dec. 22, 1992, now U.S. Pat. No. 5,357,145, for AN INTEGRATED WAVESHAPING CIRCUIT. The referenced related applications are hereby incorporated by reference to provide additional background information regarding the present invention.

BACKGROUND OF THE INVENTION

1. Field of the Invention.

The present invention relates to local area networks and, in particular, to an architecture for a coding and transceiving Ethernet circuit that connects a network interface controller to a transmission medium.

2. Description of the Related Art.

A local area network is a communication system that allows personal computers, workstations, servers, and other network devices within a small area, such as a single building or a group of adjacent buildings, to transfer information between each other. Each device connected to the network communicates with other devices on the network by following a standard which defines the operation of the network. One of the most widely accepted standards for local area networks is the IEEE 802.3 CSMA/CD Ethernet Protocol.

In the CSMA/CD (Carrier Sense Multiple Access with Collision Detection) Ethernet Protocol, before transmitting data onto the network, each device first monitors the network to insure that no transmissions are currently in progress (Carrier Sense). When the network is idle (no transmissions in progress), each device can transmit information onto the network (Multiple Access). When more than one device transmits at the same time, each transmitting device must be able to detect this condition (Collision Detection), stop its transmission, and retry.

The IEEE 802.3 CSMA/CD Ethernet Protocol defines four physical layer specifications which differ primarily in the physical cables utilized. Coaxial cables are defined by a Thick Coax Ethernet (10BASE5), which utilizes a double-shielded coaxial cable, and a Thin Coax Ethernet (10BASE2), which utilizes a single-shielded coaxial cable. Twisted pair cables are 26 to 22 AWG unshielded wire. The Thick Coax Ethernet, Thin Coax Ethernet, and Twisted Pair Ethernet each utilize a 10 megabit per second data rate.

As shown in FIG. 1, an Ethernet node can be connected to an Ethernet network by first connecting a host bus of a network device to a network interface controller, such as the National Semiconductor Corporation DP8390 Network Interface Controller. The network interface controller implements all media access control layer functions in accordance with the IEEE 802.3 standard.

Next, the network interface controller is connected to a serial network interface, such as the National Semiconductor Corporation DP83910A CMOS Serial Network Interface. The serial network interface provides the Manchester data encoding and decoding functions specified in the IEEE 802.3 standard.

The serial network interface can then be connected to either a coaxial transceiver, known as a 10BASE5 medium attachment unit (10BASE5 MAU), or a twisted-pair transceiver, known as a 10BASE-T medium attachment unit (10BASE-T MAU) via an AUI (attachment unit interface) cable and isolation transformers. The coaxial transceiver can then be connected directly to a coaxial cable while the twisted pair transceiver can then be connected to a twisted pair media via an isolation transformer. The isolation transformers are utilized to electrically isolate the serial network interface from the coaxial transceiver and the twisted pair transceiver and to electrically isolate the twisted pair transceiver from the twisted pair media.

The 10BASE5 transceiver, such as the National Semiconductor Corporation DP8392 Coaxial Transceiver Interface, and the 10BASE-T transceiver, such as the National Semiconductor Corporation DP83922 Twisted Pair Transceiver (TPI), both provide transmitter, receiver, collision detection, Jabber timer, and heartbeat functions in accordance with the IEEE 802.3 standard. In addition, the twisted pair transceiver provides a link test function and a link generation function.

In the installation shown in FIG. 1, the twisted-pair and coaxial transceivers are separate units which, as stated above, are connected to the serial network interface by an AUI cable. Frequently, in twisted pair applications, it is desirable to be able to connect an Ethernet node directly to a twisted pair cable and thereby eliminate the need for a separate twisted pair transceiver unit and a separate AUI cable. Thus, there is a need to combine the functionality of the twisted pair transceiver with the functionality of the serial network interface.

SUMMARY OF THE INVENTION

The present invention provides a coding and transceiving Ethernet circuit that configures itself to communicate across either a twisted pair medium via an external transformer or a medium attachment unit via an attachment unit interface (AUI) by utilizing switching circuitry that switches between a twisted pair data pathway and an AUI data pathway.

The Ethernet circuit of the present invention combines the basic functionality of the serial network interface and a twisted pair transceiver in a single integrated package. In addition to reducing costs associated with multiple chip sets, the Ethernet circuit allows a network interface controller to directly attach to a twisted pair medium via isolation transformers.

In accordance with the present invention, the coding and transceiving Ethernet circuit includes a link integrity circuit that detects the presence of link pulse signals and a pair of input data signals on the twisted pair medium, that indicates the absence of the link pulse signals and the data input signals when both the link pulse signals and data input signals have been continuously undetected for a first predetermined period of time, that indicates when either the link pulse signals or the pair of input data signals are present, and that periodically generates an internal link pulse signal when an external controller indicates the absence of a data transmit command. A Jabber circuit indicates an excessive transmission for a second period of time when the external controller has continuously indicated the data transmit command for a third predetermined period of time. The Ethernet circuit includes a transmit path that includes an encoder that encodes a controller data signal received from the external controller when the external controller indicates the presence of the data transmit command, that transmits the encoded data signal as an encoded twisted pair signal when a twisted pair interface (TPI) data pathway is selected, and that transmits the encoded data signal as an encoded AUI signal when an attachment unit interface (AUI) data pathway is selected. An AUI driver transmits a pair of AUI transmit output signals in response to the encoded AUI signal. A twisted pair driver transmits a pair of output data signals and a pair of delayed output data signals in response to the encoded twisted pair signal, transmits an output link pulse signal in response to the internal link pulse signal, stops transmission of the pair of output data signals and the pair of delayed output data signals when the link integrity circuit indicates the absence of the link pulse signals and the pair of input data signals, and stops transmission of the pair of output data signals and the pair of delayed output data signals for the second period of time when the jabber circuit indicates an excessive transmission. The Ethernet circuit includes a receive path that includes a twisted pair receiver that detects the pair of input data signals on the twisted pair medium, that indicates when valid data is present, that generates a twisted pair input data signal when valid data is present, and that stops detecting the pair of input data signals when the link integrity circuit indicates the absence of the link pulse signals and the pair of input data signals. An AUI receiver generates an AUI input data signal when a pair of AUI input signals are detected. A decoder decodes the twisted pair input data signal when the TPI data pathway is selected, decodes the AUI input signal when the AUI data pathway is selected, indicates the presence of decoded data, and generates a received data signal and a recovered clock signal in response to the decoded signal. A collision circuit generates a twisted pair collision signal when the external controller indicates the presence of the data transmit command and the twisted pair receiver indicates that valid data is present, when the jabber circuit indicates an excessive transmission, the collision signal lasting for the second predetermined period of time, and when the external controller indicates a transition from the presence to the absence of the data transmit command. A collision multiplexer selects the twisted pair collision signal when the TPI data pathway is selected, and selects an externally-generated AUI collision signal when the AUI data pathway is selected. A collision decoder decodes the selected collision signal and generates an output collision signal in response thereto. In the present invention, the Ethernet circuit includes an autoswitch circuit that selects the TPI data pathway in response to a first logical state of an externally-generated autoswitch signal, that changes from the TPI data pathway to the AUI data pathway when the link integrity circuit indicates the absence of both the link pulse signals and the pair of input data signals, when the Jabber circuit indicates the absence of an excessive transmission, and when the external controller indicates the absence of the data transmit command, and that changes from the AUI data pathway to the TPI data pathway when the link integrity circuit indicates the presence of either the link pulse signals or the pair of input data signals, when the decoder indicates the absence of decoded data, and when the external controller indicates the absence of the data transmit command.

In the present invention, the autoswitch circuit can also select the data pathway defined by the logical state of an externally-generated mode signal when the autoswitch signal indicates a second logical state. When the data pathway of the autoswitch circuit is defined by the mode signal, the autoswitch circuit changes from the TPI data pathway to the AUI data pathway when the jabber circuit indicates the absence of an excessive transmission and when the external controller indicates the absence of the data transmit command, and changes from the AUI data pathway to the TPI data pathway in response to the mode signal when the decoder indicates the absence of decoded data and when the external controller indicates the absence of the data transmit command. In addition, when the AUI data pathway is selected and the autoswitch signal indicates the second logical state, the link integrity circuit does not detect the presence of the link pulse signals and the pair of input data signals and does not generate the internal link pulse signal.

Since the Ethernet circuit of the present invention is intended to work when the basic functionality of a transceiver and an encoder/decoder are combined, the present invention is equally applicable to Ethernet circuits which exclude the functionality of the collision multiplexer and the collision decoder.

In addition, the autoswitch circuit of the present invention can be configured to switch between data pathways in response to the absence or presence of the link pulse signals and the input data signals and other combinations of the logical states of the signals from the jabber circuit and the decoder circuit as well as the data transmit command.

For example, the autoswitch circuit can change from the TPI data pathway to the AUI data pathway when the link integrity circuit indicates the absence of both the link pulse signals and the pair of input data signals and when the external controller indicates the absence of the data transmit command, and can change from the AUI data pathway to the TPI data pathway when the link integrity circuit indicates the presence of either the link pulse signals or the pair of input data signals and when the external controller indicates the absence of the data transmit command.

In addition, the autoswitch circuit can change from the TPI data pathway to the AUI data pathway when the link integrity circuit indicates the absence of both the link pulse signals and the pair of input data signals and when the jabber circuit indicates the absence of an excessive transmission, and can change from the AUI data pathway to the TPI data pathway when the link integrity circuit indicates the presence of either the link pulse signals or the pair of input data signals and when the decoder indicates the absence of decoded data.

A better understanding of the features and advantages of the present invention will be obtained by reference to the following detailed description and the accompanying drawings which set forth an illustrative embodiment in which the principles in the invention are utilized.

BRIEF DESCRIPTION OF THE DRAWINGS

FIGS. 6A–C are descriptions of the individual I/O pins in the FIG. 5 pin out diagram.

FIGS. 16A–C are descriptions of the individual I/O pins in the FIG. 15 pin out diagram.

DETAILED DESCRIPTION

Figure 1:
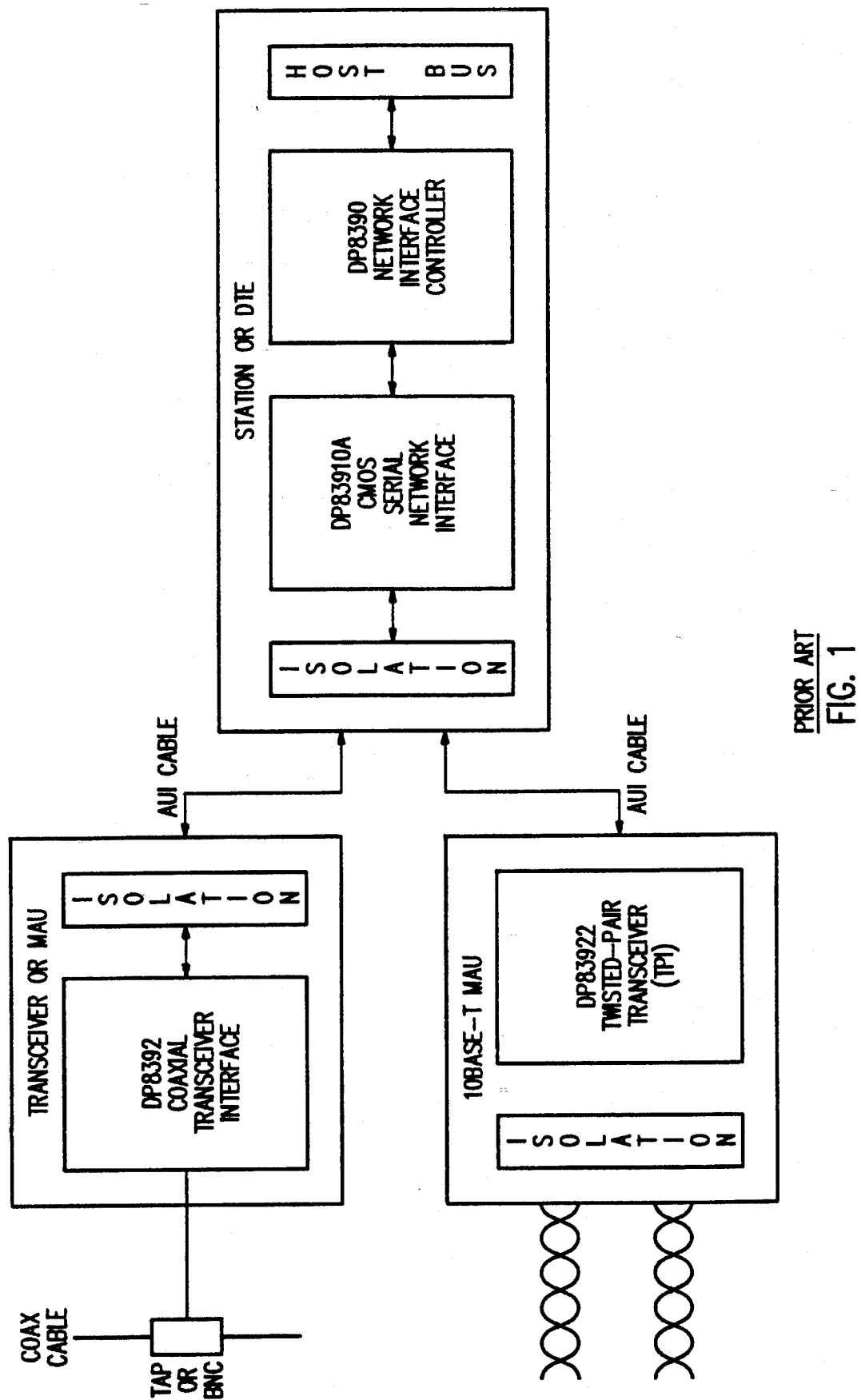
FIG. 1 is a block diagram illustrating the host bus of a device connected to a twisted pair transmission medium and a coaxial transmission medium.
Figure 2:
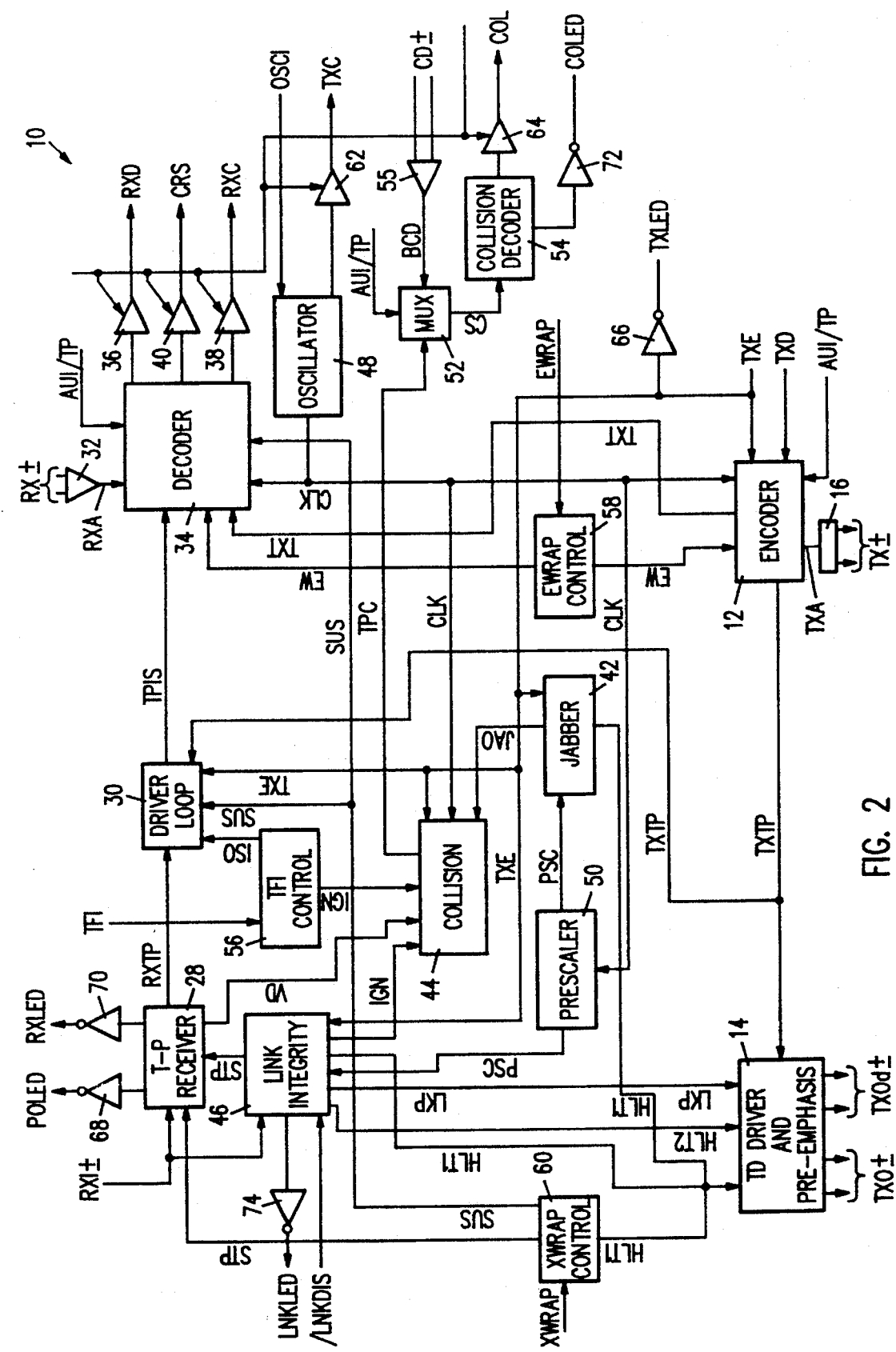
FIG. 2 is a block diagram illustrating an embodiment of a coding and transceiving Ethernet circuit 10 in accordance with the present invention.

FIG. 2 shows a block diagram of an embodiment of a coding and transceiving Ethernet circuit 10 in accordance with the present invention. Coding and transceiving Ethernet circuit 10 connects an external network interface controller (not shown in FIG. 2) to a twisted pair transmission medium (not shown in FIG. 2) without an AUI cable as well as to a medium attachment unit (not shown in FIG. 2) via an AUI cable (not shown in FIG. 2) in accordance with IEEE standard 802.3, which is hereby incorporated by reference.

As shown in FIG. 2, an encoder 12 receives a NRZ data signal TXD input from the external network interface controller and Manchester encodes the NRZ data signal TXD to produce either an encoded twisted pair signal TXTP, an encoded AUI signal TXA, or an encoded test signal TXT. Encoder 12 transmits the encoded twisted pair signal TXTP to a twisted pair driver 14 and the AUI encoded data signal TXA to an AUI driver 16 in response to a select signal AUI/TP, or, transmits the encoded test signal TXT in response to an encoder wrap signal EW.

In the preferred embodiment, the encoded AUI signal TXA is transmitted to AUI driver 16 when the select signal AUI/TP is asserted and the encoded twisted pair signal TXTP is transmitted to twisted pair driver 14 when the select signal AUI/TP is deasserted. Thus, the select signal AUI/TP determines whether a twisted pair interface (TPI) data pathway or an attachment unit interface (AUI) data pathway is selected.

Encoder 12 begins encoding the NRZ data signal TXD on the rising edge of an internal clock signal CLK when an externally provided transmit enable signal TXE is high and stops encoding when the transmit enable signal TXE is low. Each of the encoded signals TXTP, TXA, and TXT are generated as TTL/MOS level signals.

AUI driver 16 generates a pair of complementary AUI transmit output signals TX+/− in response to the encoded AUI signal TXA and drives the pair of complementary AUI transmit output signals TX+/− directly onto the AUI cable.

Twisted pair driver 14 generates a pair of complementary twisted pair transmit output signals TXO+/− and a pair of delayed complementary transmit output signals TXOd+/− in response to the encoded twisted pair signals TXTP. The pair of complementary twisted pair transmit output signals TXO+/− and the pair of delayed complementary twisted pair transmit output signals TXOd/− are generated by first forming a differential signal (not shown in FIG. 2) from the encoded twisted pair signal TXTP, then dividing the differential signal into two transmit paths, and then delaying one of the transmit paths. The pair of delayed complementary transmit output signals TXOd+/− are delayed approximately 50 ns or one half of a bit cell.

Twisted pair driver 14 then drives the transmit output signals TXO+, TXO−, TXOd+, and TXOd− onto an external waveshaping circuit (not shown in FIG. 2) via well-known driver circuitry (not shown in FIG. 2) which utilizes one driver circuit (not shown in FIG. 2) for each transmit output signal TXO+, TXO−, TXOd+, and TXOd−. External to circuit 10, the transmit output signals TXO+, TXO−, TXOd+, and TXOd− are typically transmitted onto the twisted-pair medium by first resistively combining the transmit output signals TXO+, TXO−, TXOd+, and TXOd− to form a pair of complementary combined transmit signals TXC+/− which are then filtered to form a pair of complementary output signals Vin+/−.

The resistive combination and filtering steps waveshape the transmit waveform of the output signals Vin+/− in accordance with the 10BASE-T specification of the IEEE 802.3 standard to compensate for the low-pass filter effect generated by the twisted pair medium. The low-pass filter effect causes less attenuation to an alternating series of Manchester-encoded logic ones and zeros than to either a series of Manchester-encoded logic ones or zeros. An output waveform is then generated on the twisted-pair medium by feeding the output signals Vin+/− into a transformer connected to the twisted-pair medium.

Figure 3:
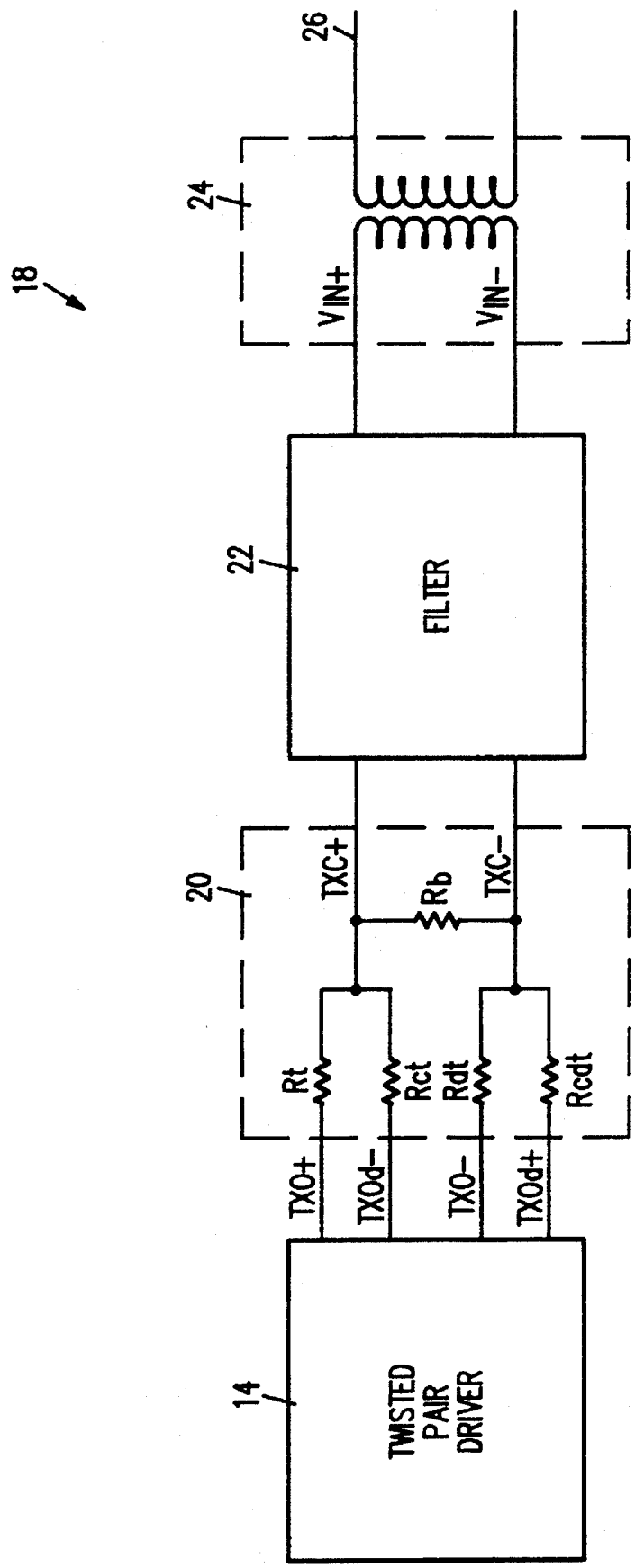
FIG. 3 is a circuit diagram illustrating a commonly utilized circuit 18 for resistively combining and filtering the output data signals TXO+, TXO−, TXOd+ and TXOd−.

FIG. 3 shows a commonly utilized circuit 18 for resistively combining and filtering the transmit output signals TXO+, TXO−, TXOd+, and TXOd−. As shown in FIG. 3, twisted pair driver 14 drives the transmit output signals TXO+, TXO−, TXOd+, and TXOd− onto an external summing resistor network 20 as square-wave current signals.

The external summing resistor network 20 includes a resistor Rt, a resistor Rct, a resistor Rdt, a resistor Rcdt, and a resistor Rb. The summing resistor network 20 generates the pair of complementary combined transmit signals TXC+/− as square-wave voltage signals by summing together the voltages generated by driving the transmit output signal TXO+ and the delayed complementary transmit output signal TXOd− across resistor Rt and resistor Rct, respectively, and by summing together the voltages generated by driving the complementary transmit output signal TXO– and the delayed transmit output signal TXOd+ across resistor Rdt and resistor Rcdt, respectively.

An external filter 22, which is typically implemented as a conventional low-pass L-C filter, generates the output signals Vin+/– by attenuating the harmonic components of the pair of combined transmit signals TXC+/–.

The output signal Vin+ and the complementary output signal Vin– are then fed into an external 1:1 transformer 24, which isolates the preceding circuitry 14, 20, and 22 from a twisted-pair cable 26, to generate a transmitted waveform on the twisted-pair cable 26.

Referring again to FIG. 2, a twisted pair receiver 28 detects a pair of complementary twisted pair received input signals RXI+/–, which have been transmitted by other devices connected to the twisted pair transmission medium (not shown in FIG. 2), and generates both a twisted pair input data signal RXTP and a valid data present signal VD in response. In the preferred embodiment, twisted pair receiver 28 includes a squelch circuit (not shown in FIG. 2) as described in the following U.S. patent applications Ser. No. 07/905,757, entitled Method and Apparatus for Sample-Data Receiver Squelch, and Ser. No. 07/775,741, entitled Receiver Circuit with Smart Squelch, which are hereby incorporated by reference. The squelch circuit inhibits the generation of both the twisted pair input data signal RXTP and the valid data present signal VD until the twisted pair received input signals RXI+/– satisfy both a voltage threshold and a timing threshold.

Figure 4:
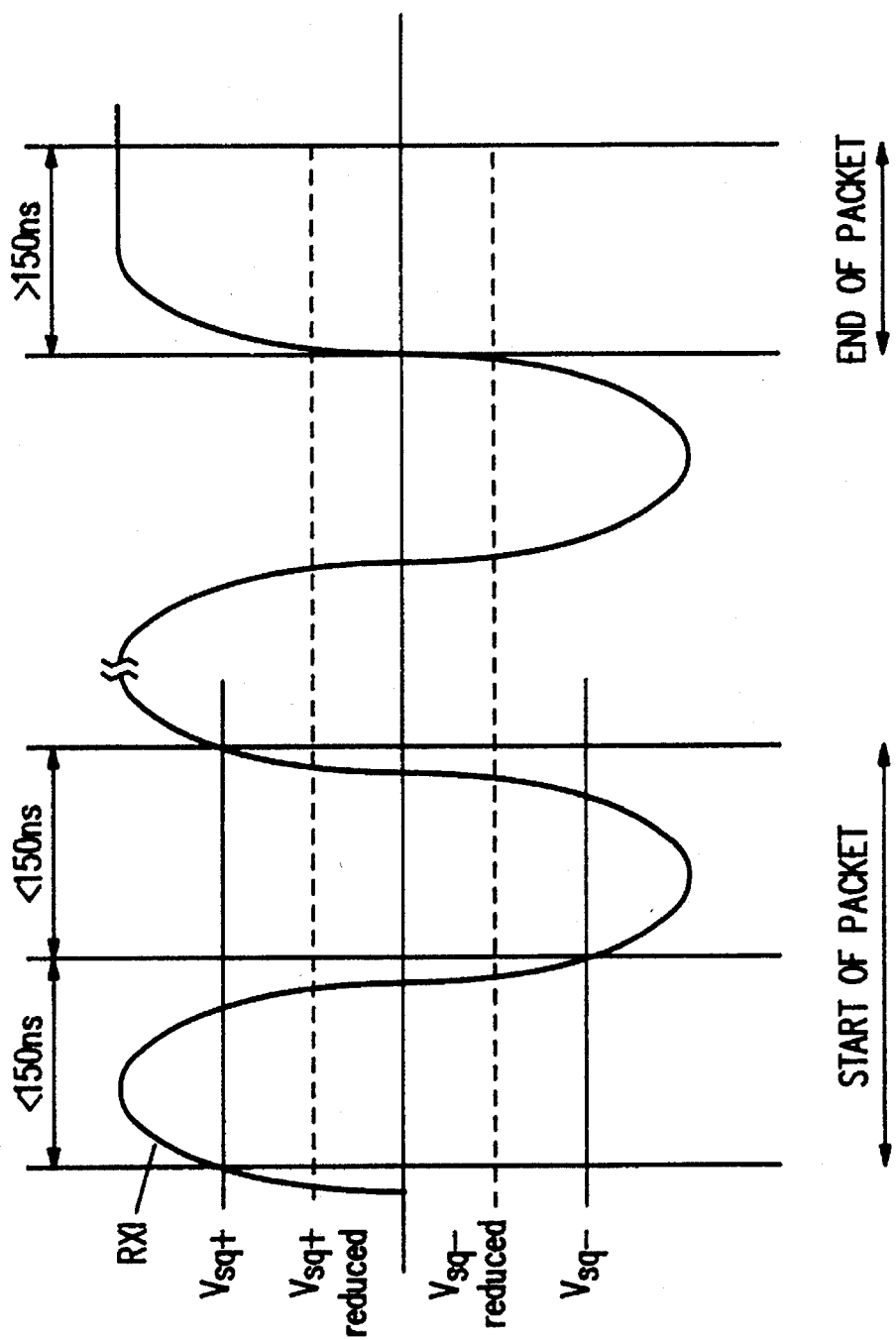
FIG. 4 is a timing diagram illustrating the operation of the receive squelch circuitry.

The squelch circuitry employs a combination of amplitude and timing measurements to determine the validity of the twisted pair received input signals RXI+/– on the twisted pair transmission medium. As shown in FIG. 4, a twisted pair received input signal RXI must first exceed a first squelch level Vsq+ (Vsq+ is either positive or negative, depending on the polarity of the RXI signal) for 12.5 ns (nanoseconds). Then, within 150 ns, the twisted pair received input signal RXI must exceed an opposite squelch level Vsq– for an additional 12.5 ns. Finally, within 150 ns, the twisted pair received input signal RXI must again exceed the original squelch level Vsq+.

After each of these conditions has been satisfied, twisted pair receiver 28 transmits the twisted pair input data signal RXTP and generates the valid data present signal VD, which indicates that valid data is present. When the valid data present signal VD is generated, twisted pair receiver 28 is reset and the squelch levels are reduced to minimum levels Vsq+/– to minimize the effect of noise which can produce a premature end of packet determination. Twisted pair receiver 28 determines a valid end of packet condition when the twisted pair received input signals RXI+/– have not satisfied the reduced squelch levels Vsq+/– within 150 ns.

Referring again to FIG. 2, a driver loopback circuit 30 receives both the twisted pair input data signal RXTP from twisted pair receiver 28, the encoded twisted pair signal TXTP from encoder 12, and the transmit enable signal TXE. Driver loopback circuit 30 selects either the twisted pair input data signal RXTP or the encoded twisted pair signal TXTP based on the logic state of the transmit enable signal TXE and the twisted pair input data signal RXTP and generates a input/encoded signal TPIS in response to the selection.

In the preferred embodiment, driver loopback circuit 30 selects the twisted pair input data signal RXTP on the falling edge and during the low duration of the transmit enable signal TXE and selects the encoded twisted pair signal TXTP on the rising edge and during the high duration of the transmit enable signal TXE. Thus, each time twisted pair driver 14 drives the transmit output signals TXO+/– and TXOd+/–, the encoded twisted pair signal TXTP is looped back into the receive path. Thus, driver loopback circuit 30 allows the encode twisted pair signal TXTP to be looped back for subsequent evaluation.

As shown in FIG. 2, an AUI receiver 32 detects a pair of complementary AUI received input signals RX+/– transmitted by other devices connected to the AUI transmission medium (not shown in FIG. 2) and generates an AUI input data signal RXA in response.

A decoder 34 receives the input/encoded signal TPIS, the AUI input data signal RXA, and the encoded test signal TXT and decodes either the input/encoded signal TPIS or the AUI input data signal RXA based on the logic state of the select signal AUI/TP, or, decodes the encoded test signal TXT in response to the encoder wrap signal EW.

Decoder 34, which consists of a differential receiver and a phase-lock-loop, separates the Manchester encoded data stream of either the input/encoded signal TPIS, the AUI input data signal RXA, or the encoded test signal TXT into a clock signal RXC and a received NRZ data signal RXD. The received NRZ data signal RXD and the received clock signal RXC, which are transmitted to the external controller via buffers 36 and 38 (see below), respectively, typically become valid within six bit times of reception. Decoder 34 can tolerate bit jitter up to 18 ns in the received data. In addition, decoder 34 generates a carrier sense signal CRS, which is transmitted to the external controller via buffer 40 (see below). The carrier sense signal CRS is a TTL/MOS level active high signal which is asserted when valid data from either the twisted pair medium or the AUI medium is present.

Decoder 34 detects the end of a frame when no more mid-bit cell transitions are detected. The carrier sense signal CRS is deasserted one and one half bit times after the last bit of data is detected. The receive clock signal RXC remains active for an additional five bit times to insure the receive timing of the external controller.

In accordance with the IEEE 802.3 standard, circuit 10 also includes a jabber circuit 42 for inhibiting excessive transmissions; a collision circuit 44 for signaling a simultaneous transmission and reception, an end of transmission, and an excessive transmission; a link integrity circuit 46 for verifying the integrity of the twisted pair medium, and an oscillator 48 and a prescaler 50 for providing synchronized timing signals throughout circuit 10.

Jabber circuit 42, which inhibits excessive transmissions, monitors each transmission of twisted pair driver 14 and disables twisted pair driver 14 whenever each transmission time exceeds a predetermined time period. As shown in FIG. 2, jabber circuit 42 monitors the transmission time of twisted pair driver 14 by detecting the transmit enable signal TXE.

In the preferred embodiment, when the transmit enable signal TXE has been active for more than 26 ms (milliseconds), jabber circuit 42 declares an excessive transmission and generates a first halt signal HLT1 which disables twisted pair driver 14. Twisted pair driver 14 remains disabled for approximately 750 ms after the falling edge of the transmit enable signal TXE is detected by jabber circuit 42. Jabber circuit 42 then deasserts the first halt signal HLT1, thereby reactivating twisted pair driver 14. When the first halt signal HLT1 is generated, jabber circuit 42 also generates a jabber signal JAB which is utilized by collision circuit 44, as described in greater detail below.

Collision circuit 44 generates a 10 MHz twisted pair collision signal TPC when either a simultaneous transmission and reception, an end of transmission, or an excessive transmission occurs. Collision circuit 44 signals a simultaneous transmission and reception when the valid data present signal VD is first received and then the transmit enable TXE is subsequently received while the valid data present signal is still asserted.

On the other hand, when the transmit enable signal TXE is detected first and the valid data present signal VD is subsequently received while the transmit enable signal TXE is still asserted, collision circuit 44 generates the twisted pair collision signal TPC only after seven bits have been received with both signals asserted. This prevents a collision from being incorrectly detected due to noise on the network. The twisted pair collision signal TPC remains asserted for the duration of the collision.

Collision circuit 44 further generates the twisted pair collision signal TPC approximately one microsecond after the end of each transmission period (the deassertion of the transmit enable signal TXE). In this condition, the twisted pair collision signal TPC typically consists of 10 cycles of a 10 MHz signal. This condition, also known as the heartbeat function, ensures the continued functioning of the collision circuitry.

Collision circuit 44 also continuously generates the twisted pair collision signal TPC as long as the jabber signal JAB is detected. In this condition, the twisted pair collision signal TPC notifies the external controller of the condition of twisted pair driver 14. As stated above, when the jabber signal is present, the twisted pair driver 14 is disabled by the first halt signal HLT1.

As shown in FIG. 2, a collision multiplexer 52 receives the twisted pair collision signal TPC and a buffered collision signal BCD, which is generated by buffering a pair of externally generated complementary AUI collision signals CD+/− in buffer 55, selects either the twisted pair collision signal TPC or the buffered collision signal BCD based on the logic state of the select signal AUI/TP, and generates a collision signal CS in response to the selection. Collision decoder 54 decodes the 10 MHz collision signal CS and generates an output TTL/MOS level collision signal COL in response to the decoding.

The link integrity circuit 46, which verifies the integrity of the twisted pair medium, includes both a link generator (not shown in FIG. 2) and a link detector (not shown in FIG. 2). The link generator is a timer circuit that generates a link pulse signal LKP in accordance with the 10BASE-T specification of the IEEE 802.3 standard. The link pulse signal LKP, which is 100 ns wide, is transmitted by twisted pair driver 14 on the TXO+ output every 16 ms in the absence of transmit data (the absence of the transmit enable signal TXE).

The link detector detects a pattern of link pulses and the pair of complementary twisted pair received input signals P, XI+/− generated by other devices connected to the twisted pair transmission medium and, if valid link pulses or the pair of received input signals RXI+/− are not detected, disables twisted pair driver 14, twisted pair receiver 28, and collision circuit 44. The link detector disables twisted pair driver 14 by generating the first halt signal HLT1, twisted pair receiver 28 by generating a stop signal STP, and collision circuit 44 by generating an ignore signal IGN.

The link detector can also generate a second halt signal HLT2 and stop detecting the pattern of link pulses in response to an externally generated link disable signal/ LNKDIS. The first halt signal HLT1 disables twisted pair driver 14 from transmitting data, but does not prevent the transmission of the output link pulse signal. The second halt signal HLT2 disables twisted pair driver 14 so that the output link pulse signal can not be transmitted.

As shown in FIG. 2, oscillator 48 generates a 10 MHz internal clock signal CLK in response to an external clock signal OSCIN. The external clock signal OSCIN can be provided by either a 20 MHz or a 40 MHz external clock signal. When the external clock signal OSCIN is provided by the 20 MHz or 40 MHz crystal, oscillator 48 divides down the frequency by 2 or 4, respectively, to obtain the 10 MHz internal clock signal CLK.

Oscillator 48 provides the 10 MHz clock signal CLK to encoder 12, decoder 34, collision circuit 44, prescaler circuit 50, and as a transmit clock signal TXC. Prescaler circuit 50 provides a one KHz clock signal PSC to link integrity circuit 46 and jabber circuit 42.

As further shown in FIG. 2, circuit 10 includes a traffic ignore circuit 56 for providing a full duplex operation and both an encoder loopback circuit 58 and a transceiver loopback circuit 60 for testing the encoded twisted pair signals TXTP without disturbing the twisted pair transmission medium.

Traffic ignore circuit 56 provides an independent transmit and receive path by disabling collision circuit 44 and isolating the loopback of the encoded twisted pair signals TXTP from driver loopback circuit 30 during a normal transmission.

As shown in FIG. 2, traffic ignore circuit 56 generates an isolate signal ISO and the ignore signal IGN in response to an external traffic ignore signal TFI. The ignore signal IGN disables collision circuit 44 while the isolate signal ISO isolates the encoded twisted pair signal TXTP from driver loopback circuit 30. This allows twisted pair receiver 28 and twisted pair driver 14 to operate simultaneously, thereby providing full duplex capabilities.

Encoder loopback circuit 58 provides a method for testing the transmit path up to encoder 12 and the receive path out to decoder 34 without disturbing the twisted pair or the AUI transmission medium and regardless of any activity on the twisted pair or AUI transmission medium. To test the transmit path up to encoder 12 and the receive path out through decoder 34, encoder loopback circuit 58 generates the encoder wrap signal EW in response to an externally generated endec loopback signal EWRAP.

As shown in FIG. 2, the encoder wrap signal EW is transmitted to encoder 12 and decoder 34. Encoder 12 receives the encoder wrap signal EW and, in response, inhibits transmission of both the encoded twisted pair signals TXTP and the encoded AUI signals TXA to the twisted pair driver 14 and the AUI driver 16, respectively. Encoder 12 then transmits the encoded test signals TXT to decoder 34.

Decoder 34 receives the encoder wrap signal EW and, in response, inhibits any reception of either the input/encoded signal TPIS from the driver loopback circuit 30 or the AUI input data signal RXA from the AUI receiver 32. Decoder 34 then decodes the encoded test signals TXT and generates the received NRZ data signal RXD, as described above. The received NRZ data signal can then be compared to the input NRZ data signal TXD for evaluation.

Transceiver loopback circuit 60 provides a method for testing the transmit path up to twisted pair driver 14 and the receive path out to driver loopback circuit 30 without disturbing the twisted pair transmission medium and regardless of any activity on the twisted pair transmission medium. To test the transmit path up to twisted pair driver 14 and the receive path out through driver loopback circuit 30, transceiver loopback circuit 60 generates the first halt signal HLT1, the stop signal STP, and a suspend signal SUS in response to an externally generated driver loopback signal XWRAP.

As shown in FIG. 2, the first halt signal HLT1 controls twisted pair driver 14 which prevents the twisted pair driver 14 from transmitting the transmit output signals TXO+/− and TXOd+/−, the stop signal STP controls twisted pair receiver 28 which prevents the twisted pair receiver 28 from receiving the twisted pair received input signals RXI+/−, and the suspend signal SUS controls driver loopback circuit 30 and to decoder 34 which selects the encoded twisted pair signal TXTP and the input/encoded signal TPIS, respectively, in response.

Encoder 12 encodes the input NRZ data signal TXD to produce the encoded twisted pair signals TXTP which are then looped through driver loopback circuit 30 to decoder 34. Decoder 34 receives the suspend SUS signal and decodes the input/encoded signal TPIS. The decoded input/encoded signal TPIS is transmitted to the external controller via buffer 31 as the received NRZ data signal RXD where it is compared to the input NRZ data signal TXD.

In the preferred embodiment of the present invention, the RXD, CRS, RXC, TXC, and COL signals are transmitted to an RXD high-impedance buffer 36, a RXC high-impedance buffer 38, a CRS high-impedance buffer 40, a TXC high-impedance buffer 62, and a COL high-impedance buffer 64, respectively. The high-impedance buffers 36, 38, 40, 62, and 64 allow circuit 10 to be connected to the external controller in parallel with other external devices, such as a TRAC (token ring analog chip) manufactured by IBM. As shown in FIG. 2, the RXD high-impedance buffer 36, the RXC high-impedance buffer 38, the CRS high-impedance buffer 40, the TXC high-impedance buffer 62, and the COL high-impedance buffer 64 are each connected to an externally generated reset signal RESET which, when asserted, causes each of the high impedance buffers 36, 38, 40, 62, and 64 to generate a high impedance output.

The status of circuit 10 can be determined by a series of external signals which, when connected to a corresponding series of external LEDs and current limiting resistors, will light the LEDs to indicate the status. As shown in FIG. 2, the transmit enable signal TXE is passed through a pulse stretcher (not shown in FIG. 2) and then buffered by invertor 66 to generate a 50 ms (millisecond) transmit LED signal TXLED. The transmit LED signal TXLED can drive an external LED, via a current limiting resistor, to show when data transmission is occurring.

In addition, twisted pair receiver 28 generates a receive LED signal RXLED and a polarity LED signal POLED which are buffered by inverters 68 and 70, respectively. The receiver LED signal RXLED drives an external receive LED to show that data is being received and the polarity LED signal POLED drives an external polarity LED to show the polarity of the received twisted pair signal RXI+/−.

Collision decoder 54 also generates a collision LED signal COLED which is buffered by invertor 72. The collision LED signal COLED drives an external LED to show that a collision is occurring. Link integrity circuit 46 also generates a link LED signal LNKLED which is buffered by invertor 74. The link pulse signal LNKLED drives an external LED to show that there is a good twisted pair link. Under normal conditions, the external link LED, when connected, will be on. The link integrity function can be disabled, as described in FIGS. 5 and 6, by an external link disable signal LNKDIS.

Figure 5:
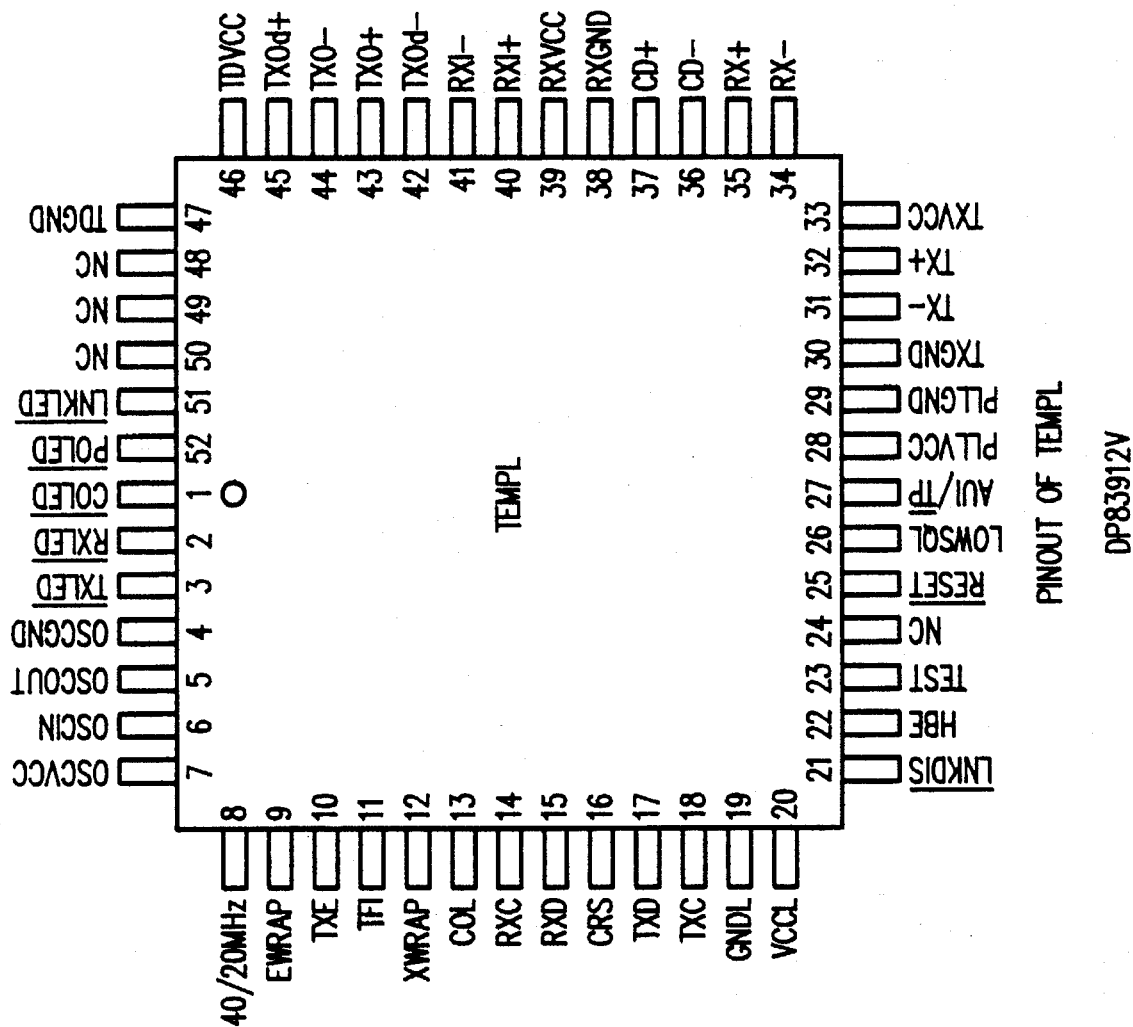
FIG. 5 is a pin out diagram illustrating the organization of the input/output pins of circuit 10.

FIG. 5 shows a pin out diagram which illustrates the organization of the input/output pins of circuit 10. FIG. 6A–C shows a description of the individual I/O pins in the FIG. 5 pin out diagram.

Figure 7:
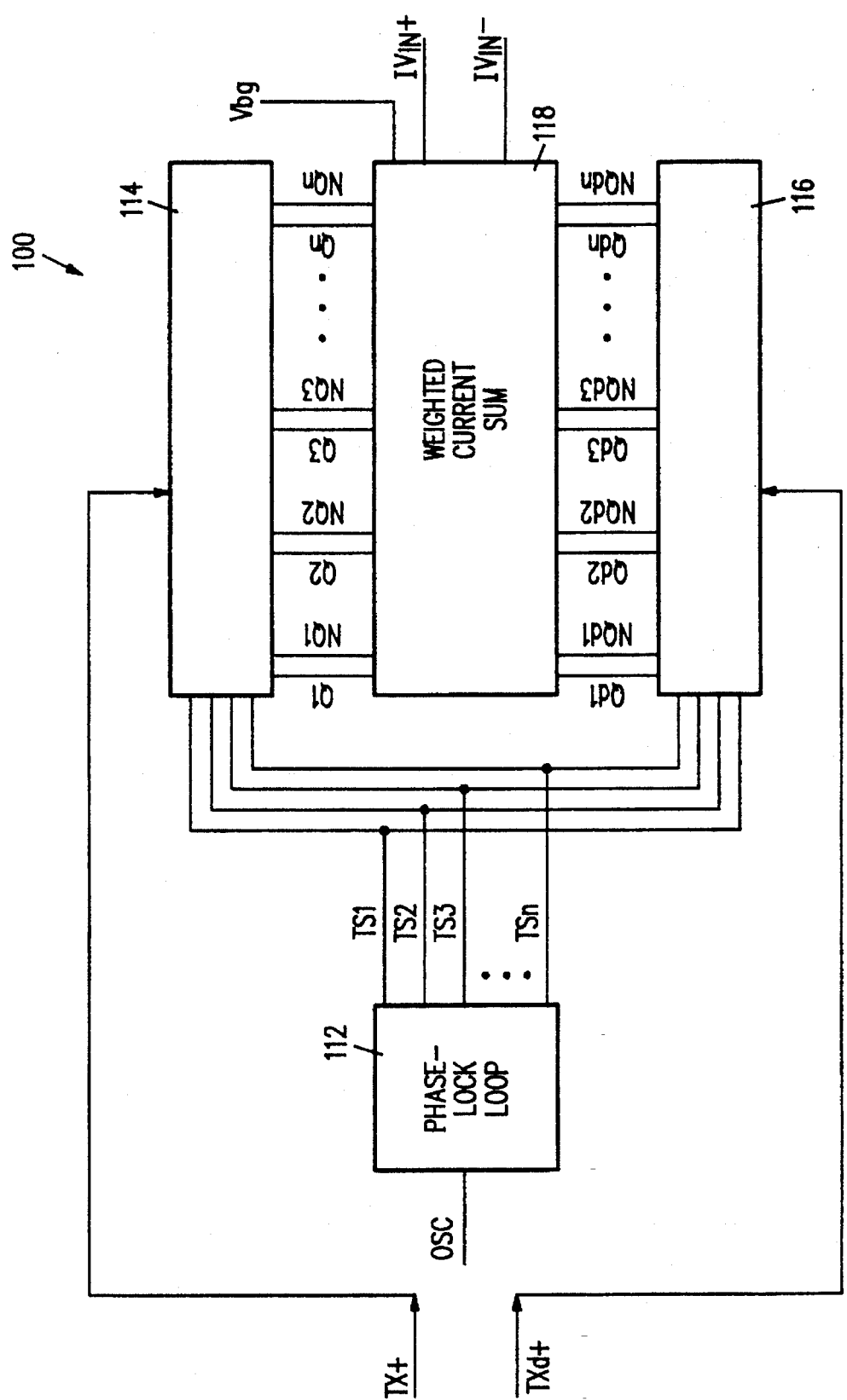
FIG. 7 is a block diagram illustrating an embodiment of waveshaping circuit 100 in accordance with the present invention.

In a first alternative embodiment, the functionality of the above-described external filter can be incorporated into circuit 10 as a waveshaping circuit. FIG. 7 shows an embodiment of waveshaping circuit 100 in accordance with the present invention.

In the FIG. 7 embodiment, waveshaping circuit 100 transmits a pair of intermediate output data signals IVin+/−, which are filtered twisted pair signals, to the well-known driver circuitry of twisted pair driver (not shown in FIG. 7) in response to both the transmit output signal TXO+ and the delayed transmit output signal TXOd+ as defined by the twisted-pair (10BASE-T) specification of the IEEE 802.3 local area network standard.

As shown in FIG. 7, waveshaping circuit 100 includes a phase-lock-loop stage 112 that generates a series of incrementally-delayed timing signals TS1-TSn in response to an externally provided oscillator signal OSC, an input logic stage 114 that generates a series of pairs of complementary logic signals Q1/NQ1-Qn/NQn in response to the series of timing signals TS1-TSn and the transmit output signal TXO+, a delayed input logic stage 116 that generates a series of pairs of complementary delayed logic signals Qd1/NQd1-Qdn/NQdn in response to the series of timing signals TS1-TSn and the delayed transmit output signal TXOd+, and a weighted current sum stage 118 that generates the intermediate output signals IVin+/− in response to both the series of pairs of complementary logic signals Q1/NQ1-Qn/NQn and the series of pairs of complementary delayed logic signals Qd1/NQd1-Qdn/NQdn.

Figure 8:
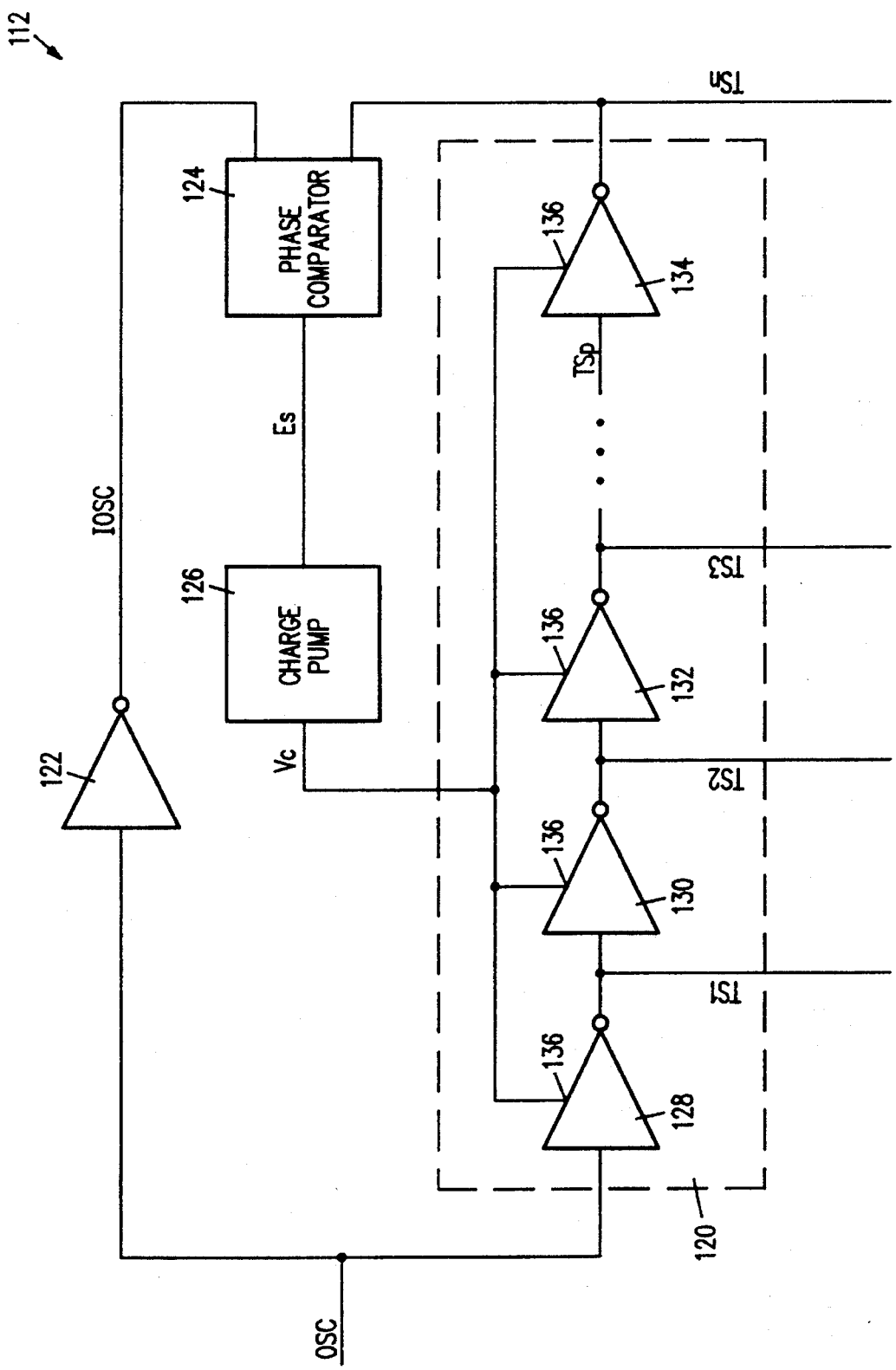
FIG. 8 is a block diagram illustrating an embodiment of phase-lock-loop stage 112 in accordance with the present invention.

FIG. 8 shows a block diagram of an embodiment of phase-lock-loop stage 112 in accordance with the present invention. As shown in FIG. 8, phase-lock-loop stage 112 includes an invertor substage 120 that generates the series of incrementally-delayed timing signals TS1-TSn in response to the oscillator signal OSC and a control voltage Vc, an oscillator invertor 122 that generates an inverted oscillator signal IOSC, a phase comparator 124 that generates an error signal Es in response to a difference between the inverted oscillator signal IOSC and the nth timing signal TSn where the nth timing signal TSn represents the total number of timing signals generated by phase-lock-loop 112, and a charge pump 126 that generates the control voltage Vc in response to the error signal ES.

Invertor substage 120 is illustrated in FIG. 8 as a series of invertor gates including a first invertor gate 128, a second invertor gate 130, a third invertor gate 132, and a nth invertor gate 134 where nth invertor gate 134 corresponds to the nth timing signal TSn.

As further shown in FIG. 8, first invertor gate 128 generates the first timing signal TS1 in response to the oscillator signal OSC, second invertor gate 130 generates the second timing signal TS2 in response to the first timing signal TS1, and third invertor gate 132 generates the third timing signal TS3 in response to the second timing signal TS2. Similarly, the nth invertor gate 134 generates the nth timing signal TSn in response to a preceding timing signal TSn.

The first timing signal TS1 and each succeeding odd-numbered timing signal are equivalent to a time delayed inverse of the oscillator signal OSC where the time delay Td of each timing signal TS1-TSn is equivalent to the propagation delay introduced by each preceding invertor gate.

As described in greater detail below, the propagation delay of each invertor gate 128, 130, 132, and 134 is substantially equivalent. Thus, the delay time Td for each timing signal TS1-TSn is defined by:

$$Td = (n) * \text{(the propagation delay)}$$

where n represents the total number of preceding invertor gates.

For example, when the logic state of the oscillator signal OSC changes from a logic low to a logic high, the logic state of the first timing signal TS1 will change from a logic high to a logic low after the propagation delay introduced by the first invertor gate 128 while the logic state of the third timing signal TS3 will change from a logic high to a logic low after the propagation delay introduced by the first three invertor gates 128, 130, and 132.

Similarly, the second timing signal TS2 and each succeeding even-numbered timing signal are equivalent to a time delayed oscillator signal where the time delay Td is defined as above. Thus, when the logic state of the oscillator signal OSC changes from a logic low to a logic high, the logic state of the second timing signal TS2 will change from a logic low to a logic high after the propagation delay introduced by the first two invertor gates 128 and 130.

The propagation delay of an invertor gate is a function of the input voltage, the channel width and length of the transistors used to fabricate the invertor gate, and the fabrication process. In the present invention, equivalent transistors are formed simultaneously in the fabrication process to have a substantially equivalent channel width and length. Thus, in the present invention, the propagation delay of each invertor gate 128, 130, 132, and 134 is determined principally by the input voltage.

As shown in FIG. 8, each invertor gate 128, 130, 132, and 134 has an input voltage terminal 136 which is connected to the control voltage Vc. Thus, the control voltage Vc sets an equivalent propagation delay across each of the invertor gates 128, 130, 132, and 134.

In the present invention, the control voltage Vc is controlled by the feedback action of oscillator invertor 122, phase comparator 124, and charge pump 126 so that the delay time Td of the nth timing signal is approximately one half of the period of the oscillator signal OSC.

As shown in FIG. 8, phase comparator 124 receives the inverted oscillator signal IOSC from oscillator invertor 122 and the nth timing signal TSn from the nth invertor gate 134, compares the two signals, and generates an error ES in response to a difference between the two signals. Charge pump 124 responds to the error signal ES by either increasing or decreasing the control voltage Vc.

The requirement for oscillator invertor 122 is dependent on whether the nth invertor gate 134 is an odd-numbered or an even-numbered invertor gate. When the logic state of the oscillator signal OSC transitions from a logic low to a logic high, the nth timing signal TSn will transition from a logic low to a logic high when the nth invertor gate 134 is even-numbered and will transition from a logic high to a logic low when the nth invertor gate 134 is odd-numbered.

Thus, in order to compare the falling edge of the oscillator signal OSC to the rising edge of an even-numbered nth timing signal TSn, the oscillator signal OSC must be inverted. As described in greater detail below, in the preferred embodiment of the present invention, 112 invertor gates are utilized.

By utilizing the feedback action of oscillator invertor 122, phase comparator 124, and charge pump 126 to generate a total propagation delay which is approximately one-half of the period of the oscillator signal OSC, a precise propagation delay, which is equivalent to the total number of invertor gates divided by one-half the period of the oscillator signal OSC, is generated.

As stated above, waveshaping circuit 100 generates the intermediate output signal IVin+ and the complementary intermediate output signal IVin− in response to both the transmit output signal TXO+ and the delayed transmit output signal TXOd+ in accordance with the twisted-pair specification of the IEEE 802.3 local area network standard. In the twisted-pair specification, the transmit output signal TXO+ is defined as a 10 Megabits per second Manchester-encoded signal. The delayed transmit output signal TXOd+ is defined as a delayed 10 Megabits per second Manchester-encoded signal where the delay is equivalent to one-half the period of the 10 Megabits per second signal or 50 ns (nanoseconds).

In the preferred embodiment, a signal which is equivalent and synchronized to the transmit output signal TXO+ is utilized as the oscillator signal OSC. Thus, in the preferred embodiment, a propagation delay of 4.167 ns results from dividing the 112 invertor gates of the preferred embodiment by the 50 ns one-half period of the oscillator signal OSC.

Therefore, for example, if the logic state of the oscillator signal OSC changes at t=0, then the logic state of the first timing signal TS1 will change approximately 4.167 ns later, the logic state of the second timing signal TS2 will change approximately 8.334 ns later, and the logic state of the twelfth timing signal will change approximately 50 ns later.

Figure 9:
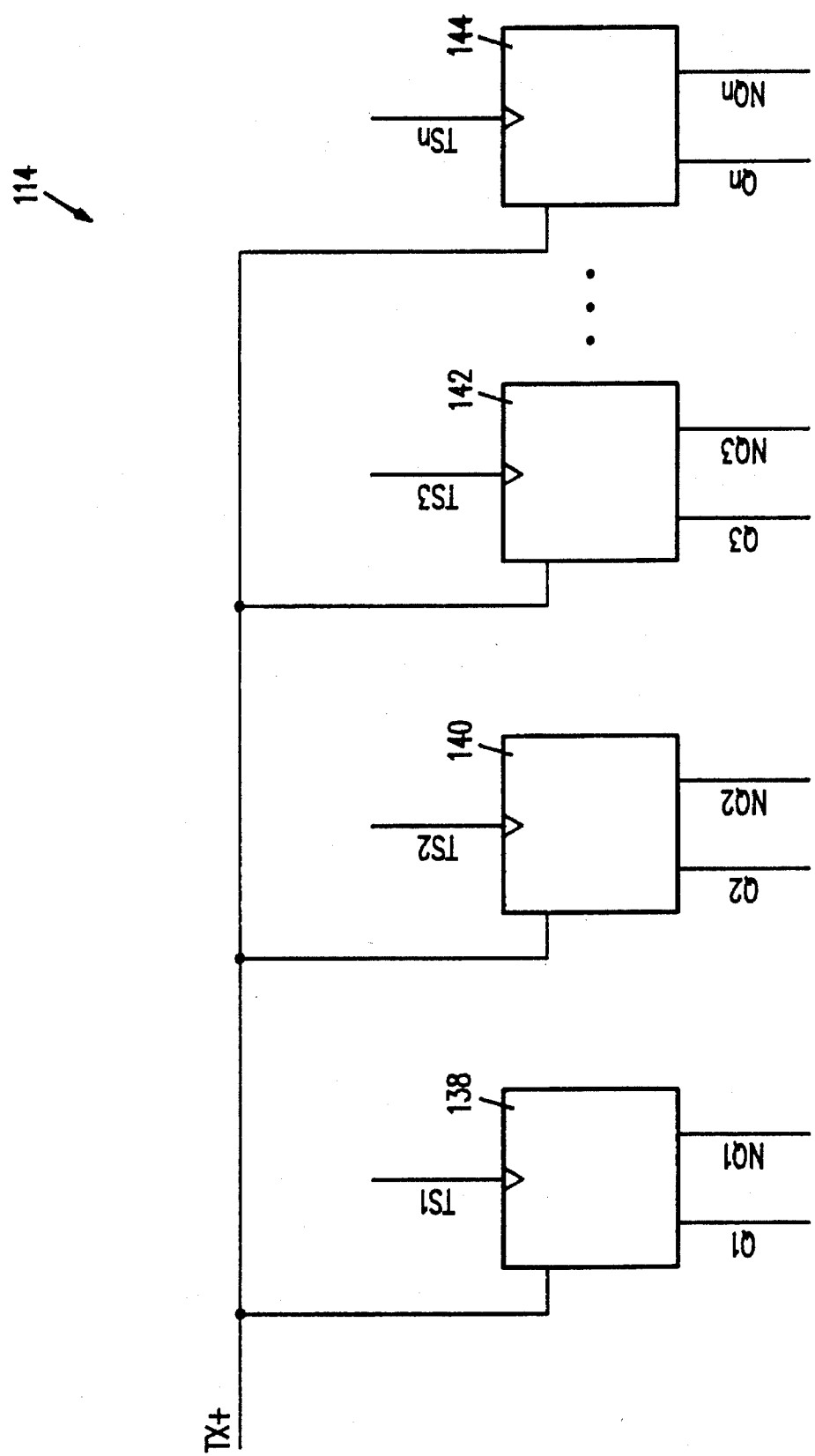
FIG. 9 is a circuit diagram illustrating an embodiment of input logic stage 114.

FIG. 9 shows an embodiment of input logic stage 114. As shown in FIG. 9, input logic stage 114 generates the series of pairs of complementary logic signals Q1/NQ1-Qn/NQn in response to the series of timing signals TS1-TSn and the transmit output signal TXO+. Each timing signal TS1-TSn generates one corresponding pair of complementary logic signals by periodically latching the transmit output signal TXO+ so that the logic state and an inverse logic state of the transmit output signal TXO+ are simultaneously provided by the one corresponding pair of complementary logic signals.

The transmit logic stage is illustrated in FIG. 9 as a series of logic blocks that includes a first logic block 138, a second logic block 140, a third logic block 142, and a nth logic block 144 where the nth logic block 144 corresponds to the nth invertor gate 134. As further shown in FIG. 9, first logic block 138 generates the first logic signal Q1 and the first complementary logic signal NQ1 in response to both the transmit output signal TXO+ and the first timing signal TS1, second logic block 140 generates the second logic signal Q2 and the second complementary logic signal NQ2 in response to both the transmit output signal TXO+ and the second timing signal TS2, and third logic block 142 generates the third transmit logic signal Q3 and the third complementary transmit logic signal NQ3 in response to both the transmit output signal TXO+ and the third timing signal TS3. Similarly, the nth logic block 144 generates the nth transmit logic signal Qn and the nth complementary transmit logic signal NQn in response to both the transmit output signal TXO+ and the nth timing signal TSn.

The logic blocks 138, 140, 142, and 144 are configured so that each of the logic signals Q1-Qn is equivalent to the period and logic state of the transmit output signal TXO+ that exists when the logic state of each corresponding timing signal TS1-TSn transitions either from a logic low to a logic high or from a logic high to a logic low.

For example, if the logic state of the transmit output signal TXO+ is high when the first timing signal TS1 transitions either from a logic low to a logic high or from a logic low to a logic high, the logic state of the first logic signal Q1 will also be high.

Similarly, the complementary logic signals NQ1-NQn are equivalent to the period and the inverse of the logic state of the transmit output signal TXO+ that exists when the logic state of each corresponding timing signal TS1-TSn transitions either from a logic low to a logic high or from a logic high to a logic low.

In operation, since the oscillator signal OSC is synchronized to the transmit output signal TXO+, when the logic state of the transmit output signal TXO+ transitions from a logic low to a logic high, the logic state of the first timing signal TS1 will transition from a logic high to a logic low and the first logic signal Q1 will transition from a logic low to a logic high after a delay principally introduced by the first invertor gate 128 (see FIG. 8).

Similarly, the logic state of the second timing signal TS2 and the second logic signal Q2 will transition from a logic low to a logic high after a delay principally introduced by the first two invertor gates 128 and 130 (see FIG. 8).

Therefore, when the logic state of the transmit output signal TXO+ transitions from a logic low to a logic high, each logic signal Q1-Qn will transition to a logic high and each complementary logic signal NQ1-NQn will transition to a logic low after the delay time associated with its corresponding invertor gate.

Figure 10:
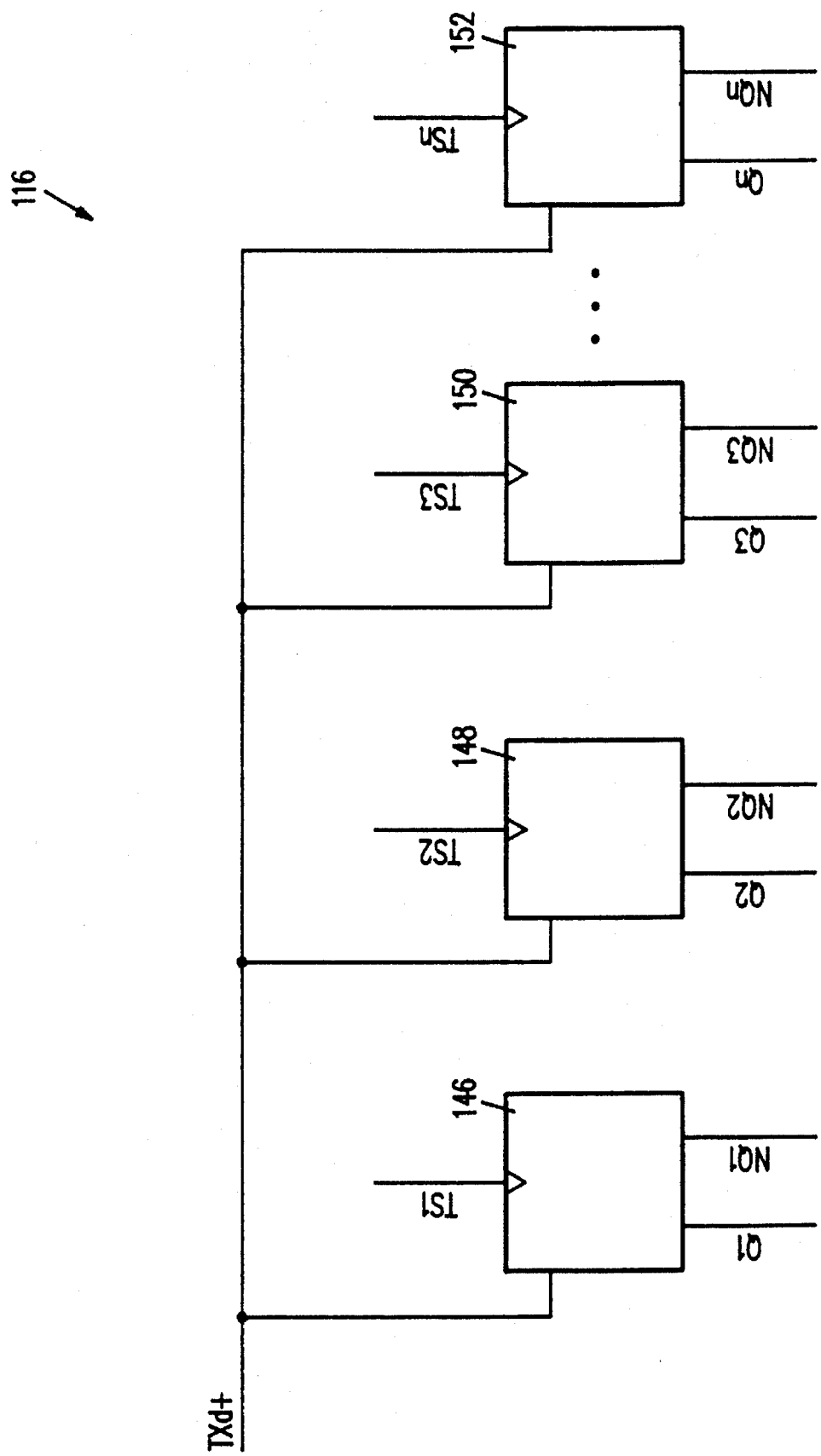
FIG. 10 is a circuit diagram illustrating an embodiment of delayed input logic stage 116 in accordance with the present invention.

FIG. 10 shows an embodiment of delayed input logic stage 116 in accordance with the present invention. As can be seen in FIG. 10, the configuration of delayed input logic stage 116, which includes a series of delayed logic blocks including a first delayed logic block 146, a second delayed logic block 148, a third delayed logic block 150, and an nth delayed logic block 152, is substantially identical to the configuration of input logic stage 114 as shown in FIG. 9. The only difference between the logic stage 114 and delayed input logic stage 116 is that the series of pairs of complementary delayed logic signals Qd1/NQd1-Qdn/NQdn are generated in response to the series of timing signals TS1-TSn, respectively, and the delayed transmit output signal TXOd+.

As with input logic stage 114, the logic blocks 146, 148, 150, and 152 are configured so that each of the delayed input logic signals Qd1-Qdn is equivalent to the logic state of the delayed transmit output signal TXOd+ that exists when the logic state of each corresponding timing signal TS1-TSn transitions either from a logic low to a logic high or from a logic high to a logic low.

Since the delayed transmit output signal TXOd+ is delayed one-half a period from the transmit output signal TXO+, when the logic state of the transmit output signal TXO+ transitions from a logic low to a logic high, each delayed input logic signal Qd1-Qdn will transition to a logic high and each complementary delayed transmit logic signal NQd1-NQdn will transition to a logic low after both the delay time associated with its corresponding invertor gate and the one-half period delay.

As shown in FIGS. 9 and 10, the series of pairs of complementary delayed logic signals Qd1/NQd1-Qdn-NQdn corresponds to the series of pairs of complementary logic signals Q1/NQ1-Qn/NQn so that each pair of delayed logic signals corresponds to one pair of logic signals.

Figure 11:
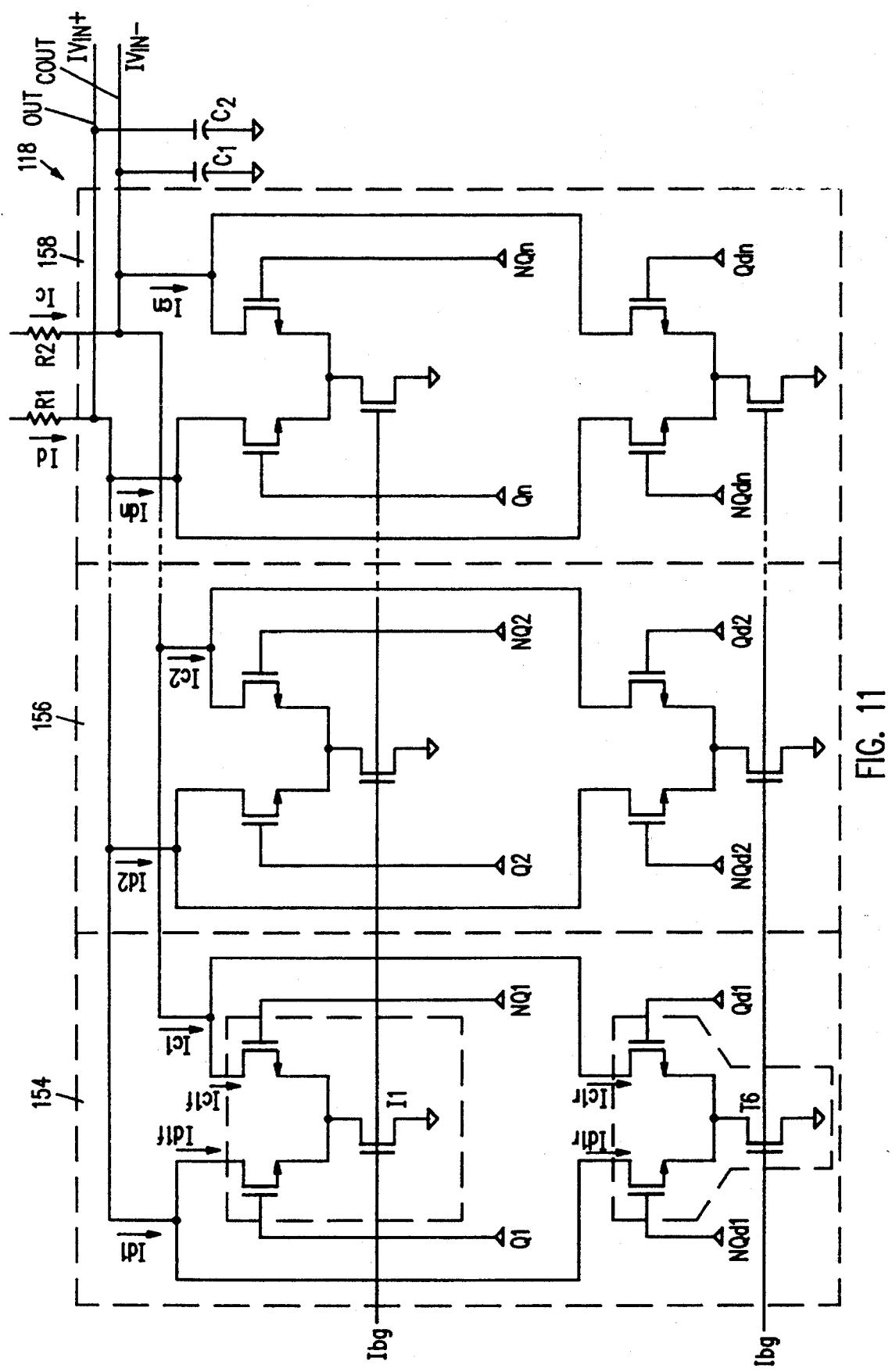
FIG. 11 is a circuit diagram illustrating an embodiment of weighted current sum stage 118 in accordance with the present invention.

FIG. 11 shows a schematic diagram of an embodiment of weighted current sum stage 118 in accordance with the present invention. Weighted current sum stage 118 generates the intermediate output data signal IVin+ and the complementary intermediate output data signal IVin− in response to both the plurality of pairs of complementary logic signals Q1/NQ1-Qn/NQn and the plurality of pairs of complementary delayed logic signals Qd1/NQd1-Qdn-NQdn.

Each pair of logic signals Q/NQ and its corresponding pair of delayed logic signals Qd/NQd simultaneously generate both an incremental portion of the intermediate output data signal IVin+ and an incremental portion of the complementary intermediate output data signal IVin−. Thus, the instantaneous value of the intermediate output data signal IVin+ is determined by summing together all the incremental portions of the intermediate output data signal IVin+ while the instantaneous value of the complementary intermediate output data signal IVin− is also determined by summing together all the incremental portions of the complementary intermediate output data signal IVin−.

Weighted current sum stage 118 is illustrated in FIG. 11 as an output resistor R1 connected between a power supply Vdd and an output node OUT, a complementary output resistor R2 connected between the power supply Vdd and a complementary output node COUT, and a series of current sources including a first current source 154, a second current source 156, and a nth current source 158 where the nth current source corresponds to the nth logic signals Qn, NQn, Qdn, and NQdn.

Each current source 154, 156, and 158 generates the portion of the intermediate output data signal IVin+ and the portion of the complementary intermediate output data signal IVin− by sinking either one of a plurality of incremental data currents Id1-Idn through the output resistor R1 or one of a plurality of complementary data currents Ic1-Icn through the complementary output resistor R2, respectively.

The series of incremental data currents Id1-Idn, each of which corresponds to one of the current sources 154, 156, and 158, are illustrated in FIG. 11 as a first incremental data current Id1, a second incremental data current Id2, and a nth incremental data current Idn where the nth incremental data current Idn corresponds to the nth current source 158.

Similarly, the series of complementary incremental data currents Ic1-Icn, each of which also corresponds to one of the current sources 154, 156, and 158, are illustrated in FIG. 11 as a first complementary incremental data current Ic1, a second complementary incremental data current Ic2, and a nth complementary incremental data current Icn where the nth complementary incremental data current Icn corresponds to the nth current source 158.

As shown in FIG. 11, the first current source 154 sinks either the first incremental data current Id1 or the first complementary incremental data current Ic1, the second current source 156 sinks either the second incremental data current Id2 or a second complementary incremental data current Ic2, and the nth current source 158 sinks either the nth incremental data current Idn or the nth complementary incremental data current Icn.

As detailed in the above-described first alternative embodiment, waveshaping circuit 100 utilizes only two (TXO+ and TXOd+) of the four transmit output signals TXO+/− and TXOd+/−. Thus, two of the four driver circuits of the well-known driver circuitry are available for other uses. Therefore, in a second alternative embodiment, twisted pair driver 14 (see FIG. 2) can utilize the four driver circuits to drive the intermediate output signals IVin+/− onto either a non-shielded (100 ohm) twisted pair cable (not shown) or a shielded (150 ohm) twisted pair cable (not shown) without increasing the total pin count by utilizing the pins no longer utilized by the remaining two driver circuits.

Figure 12:
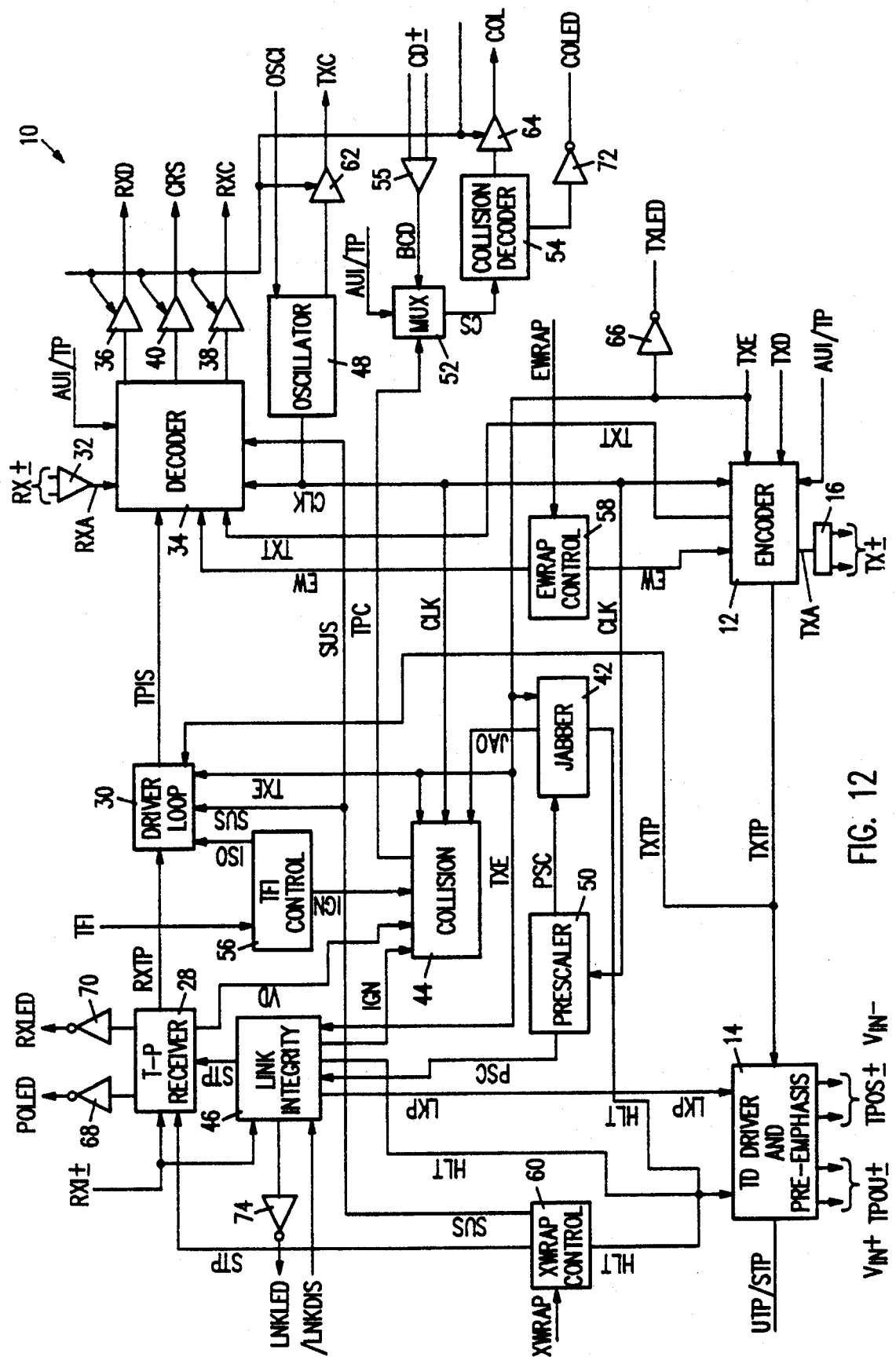
FIG. 12 is a block diagram of the first alternative embodiment illustrating the inclusion of non-shielded drivers and shielded drivers.

FIG. 12 shows the first alternative embodiment illustrating the inclusion of non-shielded drivers and shielded drivers. As shown in FIG. 12 twisted pair driver 14 receives an externally generated driver select signal UTP/STP and in response selects either the unshielded output drivers TXOU+/− or the shielded output drivers TXOS+/−.

Figure 13:
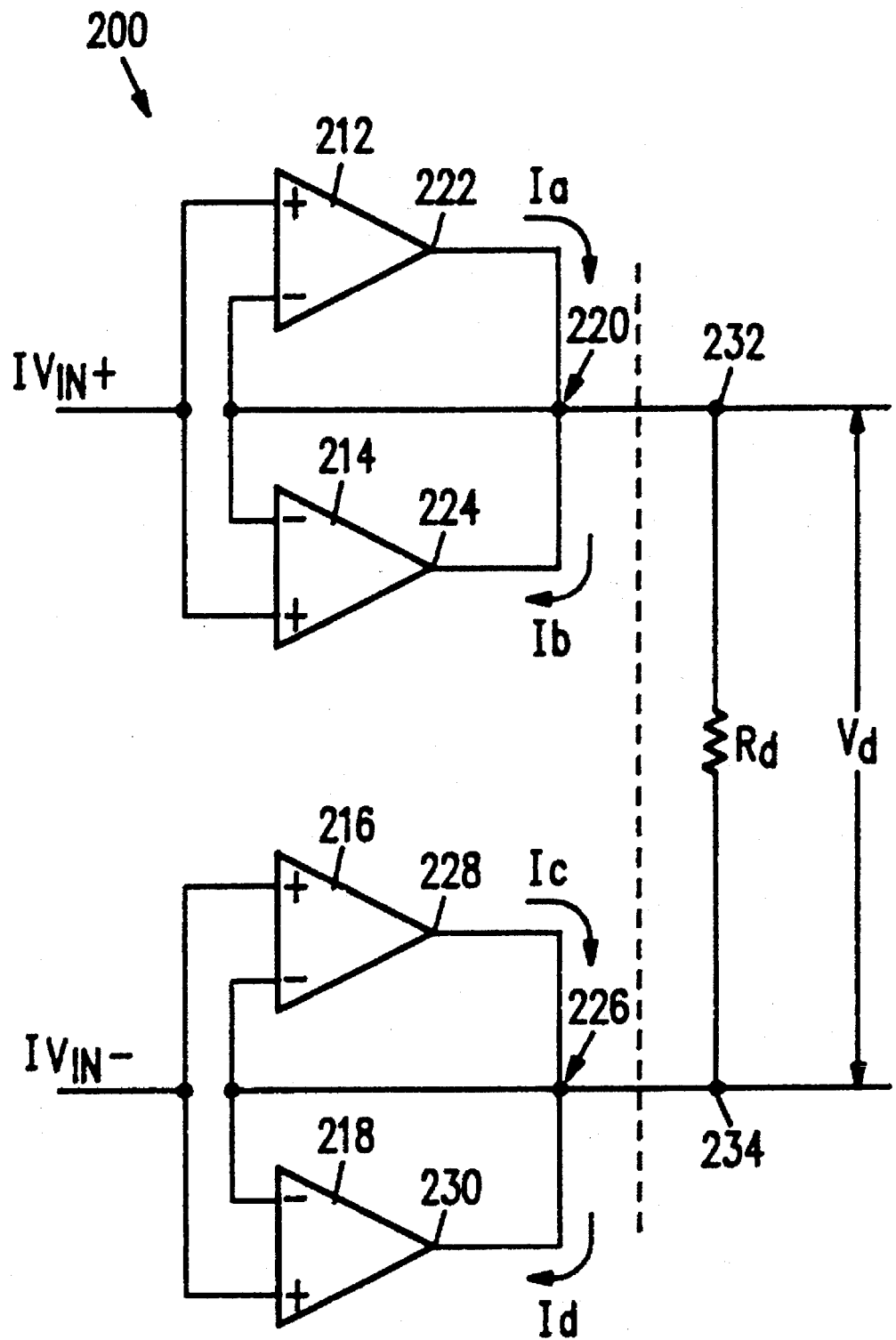
FIG. 13 is a block diagram illustrating an embodiment of low idle current driver 200 in accordance with the present invention.

In a third alternative embodiment, circuit 10 can include low idle current drivers for both the twisted pair drivers 14 and the AUI drivers 16. FIG. 13 shows a block diagram of an embodiment of low idle current driver 200 in accordance with the present invention. As shown in FIG. 13, low idle current driver 200 includes a forward current source 212, a forward current sink 214, a reverse current source 216, and a reverse current sink 218. In the preferred embodiment of the present invention, forward current source 212, forward current sink 214, reverse current source 216, and reverse current sink 218 are each unity gain differential amplifiers.

As shown in FIG. 13, both the non-inverting input of forward current source 212 and the non-inverting input of forward current sink 214 are connected to receive the intermediate output signal IVin+ while both the inverting input of forward current source 212 and the inverting input of forward current sink 214 are connected to a forward node 220. Both the output 222 of forward current source 212 and the output 224 of forward current sink 214 are also connected to the forward node 220.

Similarly, both the non-inverting input of reverse current source 216 and the non-inverting input of reverse current sink 218 are connected to receive the complementary intermediate output signal IVin− while both the inverting input of reverse current source 216 and the inverting input of reverse current sink 218 are connected to a reverse node 226. Both the output 228 of reverse current source 216 and the output 230 of reverse current sink 218 are also connected to the reverse node 230.

As further shown in FIG. 13, the output 222 of forward current source 212 and the output 224 of forward current sink 214 are connected to one end 232 of an external difference resistor Rd while the output 228 of reverse current source 216 and the output 230 of reverse current sink 218 are connected to the other end 234 of the external resistor Rd.

Figure 14C:
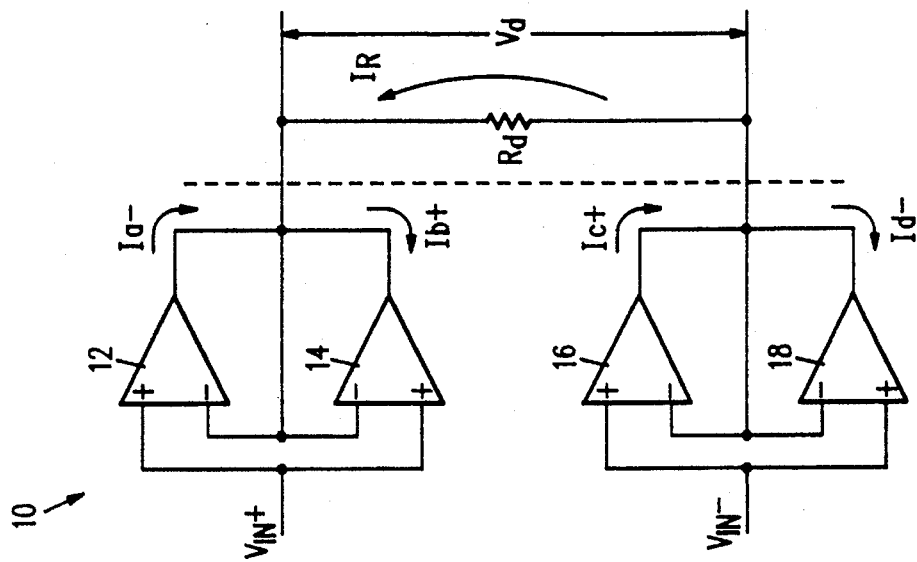
FIGS. 14A–C are circuit diagrams illustrating the operation of low idle current driver 200 in accordance with the present invention.
Figure 14B:
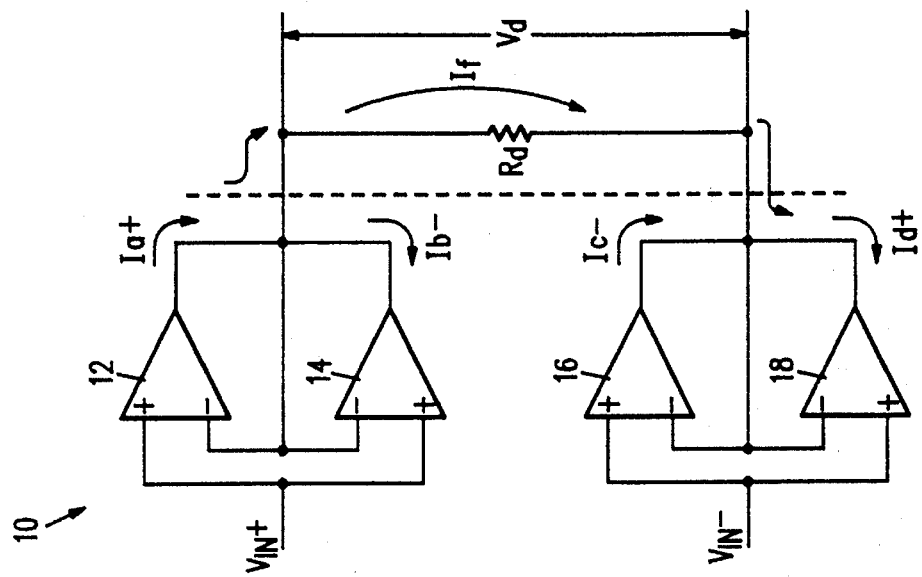
Figure 14A:
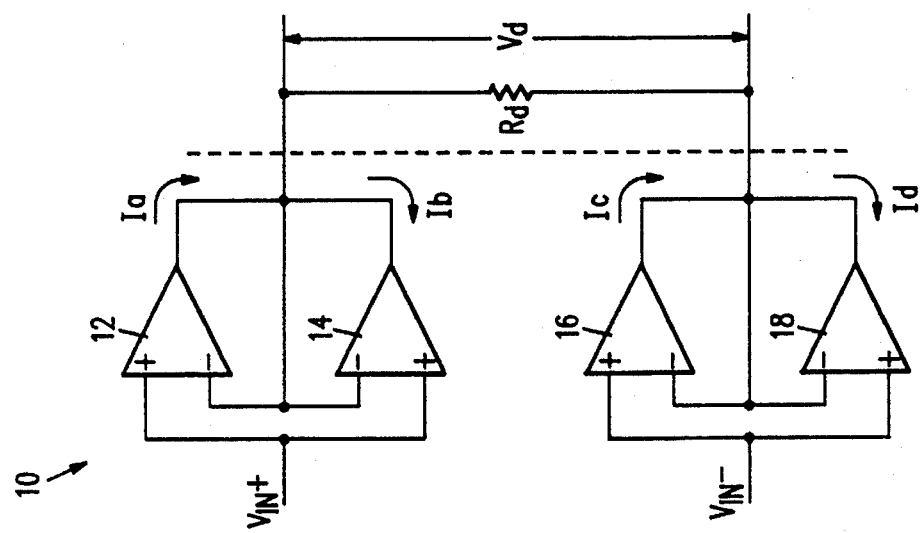

The operation of low idle current driver 200 is shown in FIGS. 14A-C. Low idle current driver 200 generates the differential signal Vd by driving a forward current If across an external difference resistor Rd when the difference between the amplitude of the intermediate output signal IVin+ and the amplitude of the complementary intermediate output signal IVin− is positive (see FIG. 14B) and by driving a reverse current Ir across the difference resistor Rd when the difference is negative (see FIG. 14C).

FIG. 14A shows a block diagram of the current flow when the amplitude of the intermediate output signal IVin+ and the amplitude of the complementary intermediate output signal IVin− are substantially equivalent. In the equivalent condition, forward current source 212 outputs an idle forward source current Ia while forward current sink 214 inputs an idle forward sink current Ib. In this condition, the idle forward source current Ia is substantially equivalent to the idle forward sink current Ib. Thus, as shown in FIG. 14A, forward current sink 214 inputs substantially all of the idle forward source current Ia output by forward current source 212.

At the same time, reverse current source 216 outputs an idle reverse source current Ic while reverse current sink 218 outputs an idle reverse sink current Id. Similarly, the idle reverse source current is substantially equivalent to the idle reverse sink current Id input. Thus, as also shown in FIG. 14A, reverse current sink 218 inputs substantially all of the idle reverse source current Ic from reverse current source 216.

In addition, the idle forward source current Ia is substantially equivalent to the idle reverse source current Ic. Thus, in the equivalent condition, substantially no current flows across external difference resistor Rd.

FIG. 14B shows a block diagram of the current flow when the difference between the amplitude of the intermediate output signal IVin+ and the amplitude of the complementary intermediate output signal IVin− is positive. With a positive difference, forward current source 212 outputs an increased forward source current Ia+ while forward current sink 214 inputs a reduced forward sink current Ib−.

The positive difference also causes reverse current source 216 to output a reduced reverse source current Ic− while reverse current sink 218 inputs an increased reverse sink current Id+. Thus, as shown in FIG. 14B, the difference in current between the increased forward source current Ia+ and the reduced forward sink current Ib− causes the forward current If to flow across external difference resistor Rd. The forward current If and the reduced reverse source current Ic− are sunk by reverse current sink 218.

FIG. 14C shows a block diagram of the current flow when the difference between the amplitude of the intermediate output signal IVin+ and the amplitude of the complementary intermediate output signal IVin− is negative. With a negative difference, forward current source 212 outputs a reduced forward source current Ia− while forward current sink 214 inputs an increased forward sink current Ib+.

The negative difference also causes reverse current source 216 to output an increased reverse source current Ic+ while reverse current sink 218 inputs a decreased reverse sink current Id−. Thus, as shown in FIG. 14C, the difference in current between the increased reverse source current Ic+ and the decreased reverse sink current Id− causes the reverse current Ir to flow across external difference resistor Rd. The reverse current Ir and the reduced forward source current Ia− are sunk by forward current sink 214.

Figure 15:
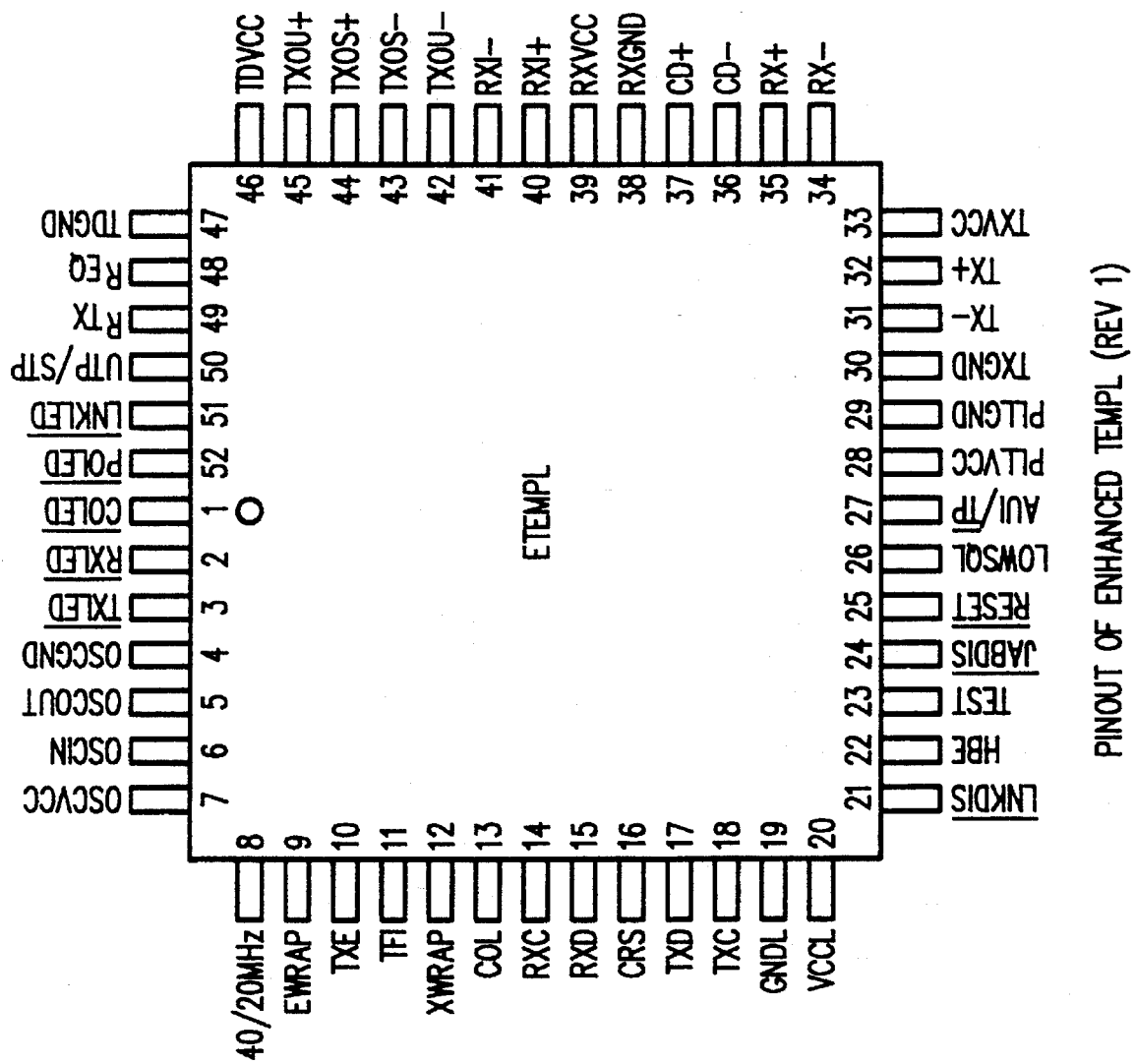
FIG. 15 is a pin out diagram illustrating the organization of the input and output (I/O) signals of circuit 10 incorporating the alternative embodiments.

FIG. 15 shows a pin out diagram which illustrates the organization of the input and output (I/O) signals of circuit 10 incorporating the alternative embodiments. FIG. 16A-C shows a description of the individual I/O pins in the FIG. 15 pin out diagram.

In a fourth alternative embodiment, circuit 10 can also include an autoswitch circuit that generates the select signal AUI/TP. As stated above, the select signal AUI/TP determines whether the TPI data pathway or the AUI data pathway is selected.

Figure 17:
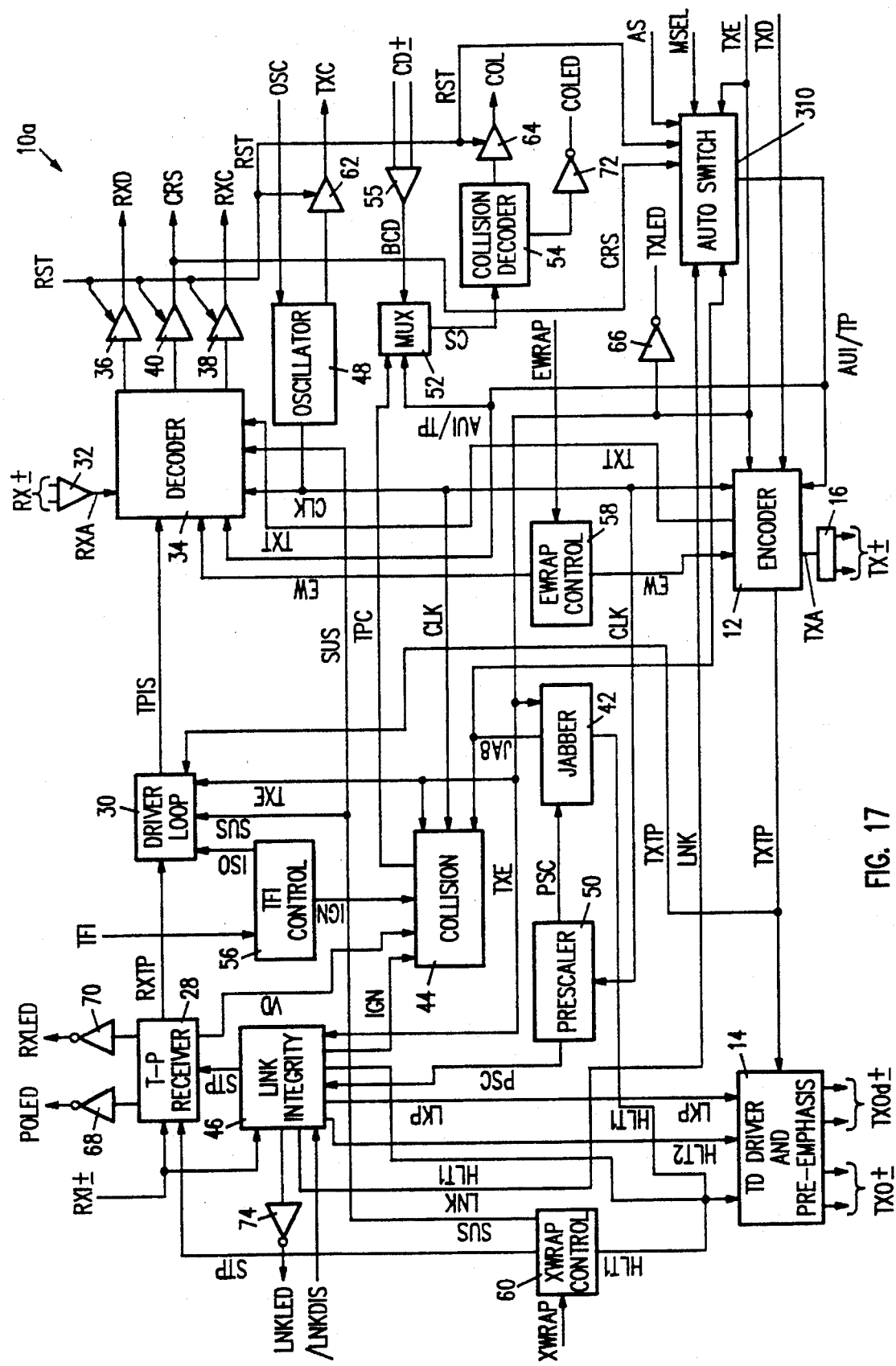
FIG. 17 is a block diagram of a circuit 10a illustrating an autoswitch circuit 310 in accordance with the fourth alternative embodiment.

FIG. 17 shows a block diagram of a circuit 10a that illustrates an autoswitch circuit 310 in accordance with the fourth alternative embodiment. As shown in FIG. 17, autoswitch circuit 310 asserts and deasserts the select signal AUI/TP in response to the logical states of an externally-generated autoswitch signal AS, an externally-generated mode select signal MSEL, a link signal LNK, the jabber signal JAB, the transmit enable signal TXE, and the carrier sense signal CRS. In addition, autoswitch circuit 310 receives the reset signal RST which, in the preferred embodiment, selects the AUI data pathway and then, on the next clock cycle, reselects the TPI data pathway.

Figure 18:
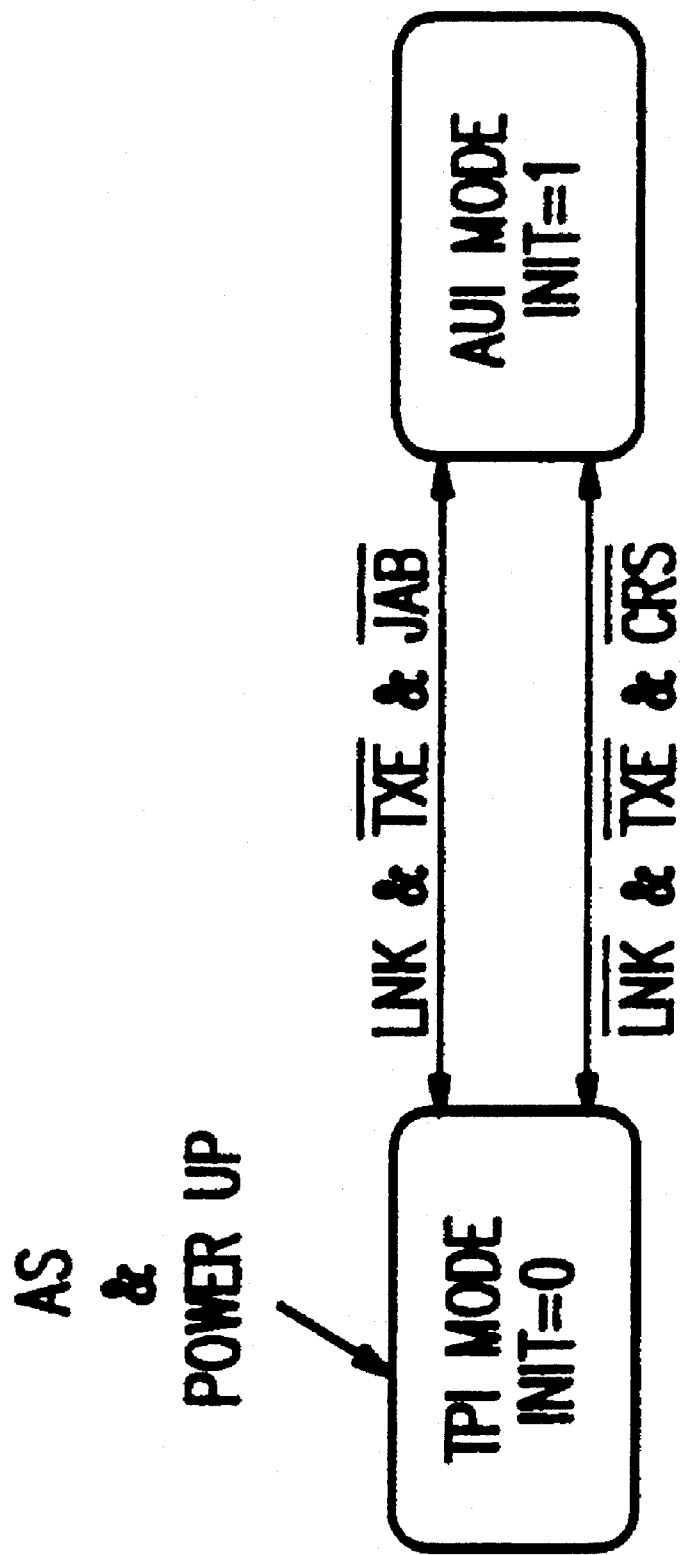
FIG. 18 is a state diagram illustrating the operation of autoswitch circuit 310.

FIG. 18 shows a state diagram that illustrates the operation of autoswitch circuit 310. As shown in FIG. 18, autoswitch circuit 310 initially selects the TPI data pathway when the autoswitch signal AS is asserted and circuit 10a is powered up. As a result, the select signal AUI/TP is deasserted and the encoded data signal, the input/encoded signal TPIS, and the twisted pair collision signal TPC are directed to twisted pair driver 14, decoder 34, and collision decoder 54, respectively.

When circuit 10a is not connected to an active twisted-pair network, link integrity circuit 46 will not receive any link pulses or twisted pair received input signals RXI+/–. As stated above, when link integrity circuit 46 does not receive any link pulses or twisted pair received input signals RXI+/–, link integrity circuit 46 disables twisted pair driver 14, twisted pair receiver 28, and collision circuit 44 by asserting the first halt signal HLT1, the stop signal STP, and the ignore signal IGN, respectively.

In the fourth alternative embodiment, in addition to asserting the first halt signal HLT1, the stop signal STP, and the ignore signal IGN, link integrity circuit 46 also asserts a link signal LNK at the same time. As with the first halt signal HLT1, the stop signal STP, and the ignore signal IGN, the link signal LNK indicates that neither the link pulses nor the received input signals RXI+/– have been received.

As a result, when the link signal LNK is asserted, autoswitch circuit 310 responds as though circuit 10a is connected to a medium attachment unit and changes from the TPI data pathway to the AUI data pathway. Thus, the select signal AUI/TP is asserted and the encoded data signal, the AUI input data signal RXA, and the external AUI collision signal CD+/– are directed to AUI driver 16, decoder 34, and collision decoder 54, respectively.

As shown in FIG. 18, autoswitch circuit 310 changes to the AUI data pathway only when the link signal LNK is asserted, and the transmit enable signal TXE and the jabber signal JAB are deasserted. By transitioning from the TPI data pathway to the AUI data pathway only when the transmit enable signal TXE is deasserted, autoswitching circuit 310 prevents a pathway change when data is being transmitted and received, thereby eliminating the transmission and reception of data fragments. By transitioning only when the jabber signal JAB is deasserted, autoswitching circuit 310 prevents a pathway change when jabber circuit 42 is responding to an excessive transmission, thereby adhering to the IEEE 802.3 specification which defines the jabber procedure.

In the present invention, when the AUI data pathway is selected, the link generator continues to generate the link pulse signal LKP while the link detector continues to detect the link pulses and the received input signals RXI+/–. As a result, whenever the link detector detects either the link pulses or the received input signals RXI+/–, the link signal LNK is deasserted and autoswitch circuit 310 responds as though circuit 10a is connected to a twisted pair medium.

As shown in FIG. 18, when the link signal LNK is deasserted, autoswitch circuit 310 re-selects the TPI data pathway only when both the transmit enable signal TXE and the carrier sense signal CRS are deasserted. As above, by switching from the AUI data pathway to the TPI data pathway only when the transmit enable signal TXE is deasserted, autoswitching circuit 310 eliminates the transmission of data fragments. Similarly, by switching only when the carrier sense signal CRS is deasserted, autoswitching circuit 310 eliminates the reception of data fragments. The carrier sense signal CRS is not required when changing from the TPI data pathway to the AUI data pathway because no data is being received when the link signal LNK is asserted.

As long as the autoswitch signal AS is asserted, the mode select signal MSEL has no effect. When the autoswitch signal AS is deasserted, however, the autoswitch function is disabled and the mode select signal MSEL becomes enabled. When the mode select signal MSEL becomes enabled, autoswitch circuit 310 selects the AUI data pathway when the mode select signal MSEL is asserted and the TPI data pathway when the mode signal is deasserted.

As above, when the mode select signal MSEL is changed to indicate the AUI data pathway, autoswitch circuit 310 changes to the AUI data pathway only when the transmit enable signal TXE and the jabber signal JAB are deasserted. Similarly, when the mode select signal MSEL is changed to indicate the TPI data pathway, autoswitch circuit 310 changes to the TPI data pathway only when the transmit enable signal TXE and the carrier sense signal CRS are deasserted.

As stated above, when the autoswitch signal AS is asserted and autoswitch circuit 310 is in the AUI mode, the link generator and link detector of link integrity circuit 46 remain active so that autoswitch circuit 310 can transition back to the TPI data pathway. When the autoswitch signal AS is deasserted and the mode select signal MSEL controls the state of the select signal AUI/TP, there is no longer any need to keep the link generator and the link detector active when the AUI data pathway is selected. Thus, when the autoswitch signal AS is deasserted and the AUI data pathway is selected, the link generator stops generating the link pulse signal LKP and the link detector stops detecting the link pulses and the received input signals RXI+/–.

Although the autoswitch circuit has been described in terms of circuit 10a of FIG. 17, the autoswitch circuit is equally applicable to a circuit which only incorporates the basic functionality of a transceiving and encoding/decoding circuit, i.e., encoder 12, driver 14, receiver 28, decoder 34, link integrity circuit 46, jabber 42, and collision circuit 44, where the functionality of multiplexer 52 and collision decoder 54 can alternately be provided as part of the basic functionality or as part of an external circuit.

In addition, autoswitch circuit 310 can also be configured to select the AUI data pathway when powered up or to switch between data pathways in response to the link signal LNK, as described, and other combinations of the Jabber signal JAB, and the carrier sense signal CRS, and the transmit enable signal TXE.

For example, autoswitch circuit 310 can be configured to change from the TPI data pathway to the AUI data pathway only when the link signal LNK is asserted and the transmit enable signal is deasserted, and can be configured to change from the AUI data pathway to the TPI data pathway only when the link signal LNK is asserted and the transmit enable signal TXE is deasserted.

Similarly, autoswitch circuit 310 can be configured to change from the TPI data pathway to the AUI data pathway only when the link signal LNK is asserted and the jabber signal JAB is deasserted, and can be configured to change from the AUI data pathway to the TPI data pathway only when the link signal LNK is deasserted and the carrier sense signal CRS is deasserted.

It should be understood that various alternatives to the structures described herein may be employed in practicing the present invention. It is intended that the following claims define the invention and that the structure within the scope of these claims and their equivalents be covered thereby.

What is claimed is:

1. A twisted pair and attachment unit interface (AUI) coding and transceiving circuit for connecting an external controller to either a twisted pair network or a coaxial network, the circuit comprising:

an encoder that encodes data received from the external controller to form outgoing encoded data when valid data is present, outputs the outgoing encoded data to a first node when a twisted pair data pathway is selected, and outputs the outgoing encoded data to a second node when an AUI data pathway is selected;

a twisted pair driver connected to the first node that receives the outgoing encoded data when the twisted pair data pathway is selected, and transmits the outgoing encoded data as a pair of output complementary twisted pair signals and a pair of output delayed complementary twisted pair signals;

an AUI driver connected to the second node that receives the outgoing encoded data when the AUI data pathway is selected, and transmits the outgoing encoded data as a pair of output complementary AUI signals;

a twisted pair receiver that receives data signals from the twisted pair network, and outputs incoming twisting pair data in response thereto;

a link integrity circuit connected to the twisted pair network that detects link pulse signals and data signals on the twisted pair network, and indicates when both the link pulse signals and the data signals have been continuously undetected for a predetermined period of time;

an AUI receiver that receives data signals from the coaxial network, and outputs incoming AUI data in response thereto;

a decoder that decodes the incoming twisted pair data to form a received data signal, a recovered clock signal, and a carrier sense signal when the twisted pair data pathway is selected, and decodes the incoming AUI data to form the received data signal, the recovered clock signal, and the carrier sense signal when the AUI data pathway is selected, the carrier sense signal indicating when data is being received;

a jabber circuit that indicates when the twisted pair driver or the AUI driver has been transmitting for more than a predefined period of time;

a collision circuit that identifies a simultaneous transmission by the twisted pair driver and reception by the twisted pair receiver, and generates a collision signal in response thereto;

a traffic ignore circuit that disables the collision circuit in response a first external command; and an autoswitch circuit that normally selects the twisted pair data pathway, and changes from the twisted pair data pathway to the AUI data pathway when the link integrity circuit indicates that both the link pulse signals and the data signals have been undetected for the predetermined period of time, wherein the coding and transceiving circuit provides full duplex operation by disabling the collision circuit.

2. The circuit of claim 1 wherein the autoswitch circuit changes from the twisted pair data pathway to the AUI data pathway when the link integrity circuit indicates that both the link pulse signals and the data signals have been undetected for the predetermined period of time, and data is not being encoded by the encoder.

3. The circuit of claim 2 wherein the autoswitch circuit changes from the AUI data pathway to the twisted pair data pathway when the link integrity circuit indicates that either the link pulse signals or the data signals have been detected, and data is not being encoded by the encoder.

4. The circuit of claim 1 wherein the autoswitch circuit changes from the twisted pair data pathway to the AUI data pathway when the link integrity circuit indicates that both the link pulse signals and the data signals have been undetected for the predetermined period of time, data is not being encoded by the encoder, and the jabber circuit is not indicating that the twisted pair driver or the AUI driver has been transmitting for more than the predefined period of time.

5. The circuit of claim 4 wherein the autoswitch circuit changes from the AUI data pathway to the twisted pair data pathway when the link integrity circuit indicates that either the link pulse signals or the data signals have been detected, data is not being encoded by the encoder, and the decoder indicates that data is not being received.

6. The circuit of claim 1 wherein the autoswitch circuit changes from the AUI data pathway to the twisted pair data pathway when the link integrity circuit indicates that either the link pulse signals or the data signals have been detected.

7. The circuit of claim 1 wherein the autoswitch circuit further receives a mode select signal that selects the twisted pair data pathway when in a first logic state and the AUI data pathway when in a second logic state, wherein the link integrity circuit generates link pulse signals, and wherein the link integrity circuit disables generation of the link pulse signals when the mode select signal is in the second logic state.

8. A twisted pair and attachment unit interface (AUI) coding and transceiving circuit for connecting an external controller to either a twisted pair network or a coaxial network, the circuit comprising:

an encoder that encodes data received from the external controller to form outgoing encoded data when valid data is present, outputs the outgoing encoded data to a first node when a twisted pair data pathway is selected, and outputs the outgoing encoded data to a second node when an AUI data pathway is selected;

a twisted pair driver connected to the first node that receives the outgoing encoded data when the twisted pair data pathway is selected, and transmits the outgoing encoded data as a pair of output complementary twisted pair signals and a pair of output delayed complementary twisted pair signals;

an AUI driver connected to the second node that receives the outgoing encoded data when the AUI data pathway is selected, and transmits the outgoing encoded data as a pair of output complementary AUI signals;

a twisted pair receiver that receives data signals from the twisted pair network, and outputs incoming twisting pair data in response thereto;

a driver loopback multiplexer that receives the outgoing encoded data and the incoming twisted pair data, passes the outgoing encoded data when the twisted pair driver is transmitting, and passes the incoming twisted pair data when the twisted pair receiver is receiving;

a link integrity circuit connected to the twisted pair network that detects link pulse signals and data signals on the twisted pair network, and indicates when both the link pulse signals and the data signals have been continuously undetected for a predetermined period of time;

an AUI receiver that receives data signals from the coaxial network, and outputs incoming AUI data in response thereto;

a decoder that decodes the incoming twisted pair data to form a received data signal, a recovered clock signal, and a carrier sense signal when the twisted pair data pathway is selected, and decodes the incoming AUI data to form the received data signal, the recovered clock signal, and the carrier sense signal when the AUI data pathway is selected, the carrier sense signal indicating when data is being received;

a jabber circuit that indicates when the twisted pair driver or the AUI driver has been transmitting for more than a predefined period of time;

a collision circuit that identifies a simultaneous transmission by the twisted pair driver and reception by the twisted pair receiver, and generates a collision signal in response thereto;

an encoder loopback circuit that directs the outgoing encoded data to the decoder and causes the decoder to decode the outgoing encoded data in response to a first external command;

a transceiver loopback circuit that disables the twisted pair receiver and the twisted pair driver, and forces the driver loopback multiplexer to select the outgoing encoded data in response to a second external command; and an autoswitch circuit that normally selects the twisted pair data pathway, and changes from the twisted pair data pathway to the AUI data pathway when the link integrity circuit indicates that both the link pulse signals and the data signals have been undetected for the predetermined period of time, wherein the coding and transceiving circuit allows testing of the encoder and decoder in response to the first external command, and testing of a transmit path out to the twisted pair driver and of a receiver path in from the driver loopback multiplexer without disturbing the twisted pair network in response to the second external command.

9. The circuit of claim 8 wherein the autoswitch circuit changes from the twisted pair data pathway to the AUI data pathway when the link integrity circuit indicates that both the link pulse signals and the data signals have been undetected for the predetermined period of time, and data is not being encoded by the encoder.

10. The circuit of claim 9 wherein the autoswitch circuit changes from the AUI data pathway to the twisted pair data pathway when the link integrity circuit indicates that either the link pulse signals or the data signals have been detected, and data is not being encoded by the encoder.

11. The circuit of claim 8 wherein the autoswitch circuit changes from the twisted pair data pathway to the AUI data pathway when the link integrity circuit indicates that both the link pulse signals and the data signals have been undetected for the predetermined period of time, data is not being encoded by the encoder, and the jabber circuit is not indicating that the twisted pair driver or the AUI driver has been transmitting for more than the predefined period of time.

12. The circuit of claim 11 wherein the autoswitch circuit changes from the AUI data pathway to the twisted pair data pathway when the link integrity circuit indicates that either the link pulse signals or the data signals have been detected, data is not being encoded by the encoder, and the decoder indicates that data is not being received.

13. The circuit of claim 8 wherein the autoswitch circuit changes from the AUI data pathway to the twisted pair data pathway when the link integrity circuit indicates that either the link pulse signals or the data signals have been detected.

14. The circuit of claim 8 wherein the autoswitch circuit further receives a mode select signal that selects the twisted pair data pathway when in a first logic state and the AUI data pathway when in a second logic state, wherein the link integrity circuit generates link pulse signals, and wherein the link integrity circuit disables generation of the link pulse signals when the mode select signal is in the second logic state.

15. A twisted pair and attachment unit interface (AUI) coding and transceiving circuit for connecting an external controller to either a twisted pair network or a coaxial network, the circuit comprising:

an encoder that encodes data received from the external controller to form outgoing encoded data when valid data is present, outputs the outgoing encoded data to a first node when a twisted pair data pathway is selected, and outputs the outgoing encoded data to a second node when an AUI data pathway is selected;

a twisted pair driver connected to the first node that receives the outgoing encoded data when the twisted pair data pathway is selected, and transmits the outgoing encoded data as a pair of output complementary twisted pair signals and a pair of output delayed complementary twisted pair signals;

an AUI driver connected to the second node that receives the outgoing encoded data when the AUI data pathway is selected, and transmits the outgoing encoded data as a pair of output complementary AUI signals;

a twisted pair receiver that receives data signals from the twisted pair network, and outputs incoming twisting pair data in response thereto;

a link integrity circuit connected to the twisted pair network that detects link pulse signals and data signals on the twisted pair network, and indicates when both the link pulse signals and the data signals have been continuously undetected for a predetermined period of time;

an AUI receiver that receives data signals from the coaxial network, and outputs incoming AUI data in response thereto;

a decoder that decodes the incoming twisted pair data to form a received data signal, a recovered clock signal, and a carrier sense signal when the twisted pair data pathway is selected, and decodes the incoming AUI data to form the received data signal, the recovered clock signal, and the carrier sense signal when the AUI data pathway is selected, the carrier sense signal indicating when data is being received;

a jabber circuit that indicates when the twisted pair driver or the AUI driver has been transmitting for more than a predefined period of time;

a collision circuit that identifies a simultaneous transmission by the twisted pair driver and reception by the twisted pair receiver, and generates a collision signal in response thereto;

a high impedance buffer connected to the decoder that buffers the received data signal, the recovered clock signal, and the carrier sense signal, and generates a high impedance output in lieu of the received data signal, the recovered clock signal, and the carrier sense signal in response to an external reset signal; and an autoswitch circuit that normally selects the twisted pair data pathway, and changes from the twisted pair data pathway to the AUI data pathway when the link integrity circuit indicates that both the link pulse signals and the data signals have been undetected for the predetermined period of time, wherein the coding and transceiving circuit provides full duplex operation by disabling the collision circuit.

16. The circuit of claim 15 wherein the autoswitch circuit changes from the twisted pair data pathway to the AUI data pathway when the link integrity circuit indicates that both the link pulse signals and the data signals have been undetected for the predetermined period of time, and data is not being encoded by the encoder.

17. The circuit of claim 16 wherein the autoswitch circuit changes from the AUI data pathway to the twisted pair data pathway when the link integrity circuit indicates that either the link pulse signals or the data signals have been detected, and data is not being encoded by the encoder.

18. The circuit of claim 15 wherein the autoswitch circuit changes from the twisted pair data pathway to the AUI data pathway when the link integrity circuit indicates that both the link pulse signals and the data signals have been undetected for the predetermined period of time, data is not being encoded by the encoder, and the jabber circuit is not indicating that the twisted pair driver or the AUI driver has been transmitting for more than the predefined period of time.

19. The circuit of claim 18 wherein the autoswitch circuit changes from the AUI data pathway to the twisted pair data pathway when the link integrity circuit indicates that either the link pulse signals or the data signals have been detected, data is not being encoded by the encoder, and the decoder indicates that data is not being received.

20. The circuit of claim 15 wherein the autoswitch circuit changes from the AUI data pathway to the twisted pair data pathway when the link integrity circuit indicates that either the link pulse signals or the data signals have been detected.

21. The circuit of claim 15 wherein the autoswitch circuit further receives a mode select signal that selects the twisted pair data pathway when in a first logic state and the AUI data pathway when in a second logic state, wherein the link integrity circuit generates link pulse signals, and wherein the link integrity circuit disables generation of the link pulse signals when the mode select signal is in the second logic state.

22. A twisted pair and attachment unit interface (AUI) coding and transceiving circuit for connecting an external controller to either a twisted pair network or a coaxial network, the circuit comprising:

an encoder that encodes data received from the external controller to form outgoing encoded data when valid data is present, outputs the outgoing encoded data to a first node when a twisted pair data pathway is selected, and outputs the outgoing encoded data to a second node when an AUI data pathway is selected;

a twisted pair driver connected to the first node that receives the outgoing encoded data when the twisted pair data pathway is selected, and transmits the outgoing encoded data as a pair of output complementary twisted pair signals and a pair of output delayed complementary twisted pair signals;

an AUI driver connected to the second node that receives the outgoing encoded data when the AUI data pathway is selected, and transmits the outgoing encoded data as a pair of output complementary AUI signals;

a twisted pair receiver that receives data signals from the twisted pair network, and outputs incoming twisting pair data in response thereto;

a link integrity circuit connected to the twisted pair network that detects link pulse signals and data signals on the twisted pair network, and indicates when both the link pulse signals and the data signals have been continuously undetected for a predetermined period of time;

an AUI receiver that receives data signals from the coaxial network, and outputs incoming AUI data in response thereto;

a decoder that decodes the incoming twisted pair data to form a received data signal, a recovered clock signal, and a carrier sense signal when the twisted pair data pathway is selected, and decodes the incoming AUI data to form the received data signal, the recovered clock signal, and the carrier sense signal when the AUI data pathway is selected, the carrier sense signal indicating when data is being received;

a jabber circuit that indicates when the twisted pair driver or the AUI driver has been transmitting for more than a predefined period of time;

a collision circuit that identifies a simultaneous transmission by the twisted pair driver and reception by the twisted pair receiver, and generates a collision signal in response thereto;

a filter circuit that combines the pair of output complementary twisted pair signals and the pair of output delayed complementary twisted pair signals to form a pair of transmitted complementary twisted pair signals;

a pair of first driver circuits;

a pair of second driver circuits;

a selection circuit that directs the pair of transmitted complementary twisted pair signal to either the pair of first driver circuits or the pair of second driver circuits in response to an external driver select signal; and an autoswitch circuit that normally selects the twisted pair data pathway, and changes from the twisted pair data pathway to the AUI data pathway when the link integrity circuit indicates that both the link pulse signals and the data signals have been undetected for the predetermined period of time, wherein the coding and transceiving circuit is formed as an integrated circuit.

23. The circuit of claim 22 wherein the autoswitch circuit changes from the twisted pair data pathway to the AUI data pathway when the link integrity circuit indicates that both the link pulse signals and the data signals have been undetected for the predetermined period of time, and data is not being encoded by the encoder.

24. The circuit of claim 23 wherein the autoswitch circuit changes from the AUI data pathway to the twisted pair data pathway when the link integrity circuit indicates that either the link pulse signals or the data signals have been detected, and data is not being encoded by the encoder.

25. The circuit of claim 22 wherein the autoswitch circuit changes from the twisted pair data pathway to the AUI data pathway when the link integrity circuit indicates that both the link pulse signals and the data signals have been undetected for the predetermined period of time, data is not being encoded by the encoder, and the jabber circuit is not indicating that the twisted pair driver or the AUI driver has been transmitting for more than the predefined period of time.

26. The circuit of claim 25 wherein the autoswitch circuit changes from the AUI data pathway to the twisted pair data pathway when the link integrity circuit indicates that either the link pulse signals or the data signals have been detected, data is not being encoded by the encoder, and the decoder indicates that data is not being received.

27. The circuit of claim 22 wherein the autoswitch circuit changes from the AUI data pathway to the twisted pair data pathway when the link integrity circuit indicates that either the link pulse signals or the data signals have been detected.

28. The circuit of claim 22 wherein the autoswitch circuit further receives a mode select signal that selects the twisted pair data pathway when in a first logic state and the AUI data pathway when in a second logic state, wherein the link integrity circuit generates link pulse signals, and wherein the link integrity circuit disables generation of the link pulse signals when the mode select signal is in the second logic state.

* * * * *